US012651347B2

(12) United States Patent
Wang et al.

(10) Patent No.: US 12,651,347 B2
(45) Date of Patent: Jun. 9, 2026

(54) MARKING SYSTEMS, METHODS, DEVICES, AND STORAGE MEDIA FOR INTESTINAL VALVE IMAGING

(71) Applicant: KEYWESTTECH LLC., Rolling Meadows, IL (US)

(72) Inventors: Shi Wang, Hangzhou (CN); Cheng Shen, Hangzhou (CN); Huogen Wang, Hangzhou (CN); Chaohui Jin, Hangzhou (CN); Ming Chen, Hangzhou (CN)

(73) Assignee: KEYWESTTECH LLC, Rolling Meadows, IL (US)

( * ) Notice: Subject to any disclaimer, the term of this patent is extended or adjusted under 35 U.S.C. 154(b) by 356 days.

(21) Appl. No.: 18/324,136

(22) Filed: May 25, 2023

(65) Prior Publication Data

US 2024/0265549 A1 Aug. 8, 2024

(30) Foreign Application Priority Data

Feb. 6, 2023 (CN) .......................... 202310131554.4

(51) Int. Cl.
*G06T 7/00* (2017.01)
*G06T 7/11* (2017.01)
(Continued)

(52) U.S. Cl.
CPC .............. *G06T 7/13* (2017.01); *G06T 7/0012* (2013.01); *G06T 2207/20081* (2013.01); *G06T 2207/20084* (2013.01)

(58) Field of Classification Search
CPC .................... G06T 7/13; G06T 7/0012; G06T 2207/20081; G06T 2207/20084; G06T 7/00; G06T 7/11; G06T 7/174; G06T 7/10; G06T 2207/10068; G06T 2207/30028; G06T 2207/30096; G06V 20/70
See application file for complete search history.

(56) References Cited

U.S. PATENT DOCUMENTS

| 7,809,177 B2 * | 10/2010 | Yoshida | .................... G06T 5/80 |
| | | | 382/128 |
| 2010/0246912 A1 * | 9/2010 | Periaswamy | ......... G06T 7/0012 |
| | | | 382/128 |
| 2011/0206250 A1 * | 8/2011 | McGinnis | ............. G06T 7/0012 |
| | | | 382/128 |

FOREIGN PATENT DOCUMENTS

WO      WO-2021220279 A1 * 11/2021 ............. G16H 30/40

OTHER PUBLICATIONS

Gerner-Rasmussen, Jonas, Anders Meller Donatsky, and Flemming Bjerrum. "The role of non-invasive imaging techniques in detecting intra-abdominal adhesions: a systematic review." Langenbeck's archives of surgery 404 (2019): 653-661. (Year: 2019).*
(Continued)

*Primary Examiner* — Oneal R Mistry
*Assistant Examiner* — Rachel L Roberts
(74) *Attorney, Agent, or Firm* — METIS IP LLC

(57) ABSTRACT

The present disclosure may provide a marking system for intestinal valve imaging. The marking system may obtain multiple intestinal images of an examined object. The marking system may perform intestinal valve segmentation on at least a portion of the multiple intestinal images to determine at least one independent intestinal valve. The marking system may also mark the at least one independent intestinal valve in the at least a portion of the multiple intestinal images.

19 Claims, 12 Drawing Sheets

(51) Int. Cl.
    *G06T 7/13*          (2017.01)
    *G06T 7/174*         (2017.01)

(56)                References Cited

OTHER PUBLICATIONS

Lu, L. et al. (2008). Simultaneous Detection and Registration for Ileo-Cecal Valve Detection in 3D CT Colonography. In: Forsyth, D., Torr, P., Zisserman, A. (eds) Computer Vision â ECCV 2008. ECCV 2008. Lecture Notes in Computer Science, vol. 5305. Springer, Berlin, Heidelberg. (Year: 2008).*

* cited by examiner

100

<u>200</u>

Intestinal image obtainment module <u>210</u>

Intestinal image segmentation module <u>220</u>

First image segmentation unit <u>221</u>

Second image segmentation unit <u>223</u>

Intestinal valve marking module <u>230</u>

Intestinal valve tracking module <u>240</u>

Intestinal valve matching unit <u>241</u>

Tracker unit <u>243</u>

Prompting module <u>250</u>

Figure 3:
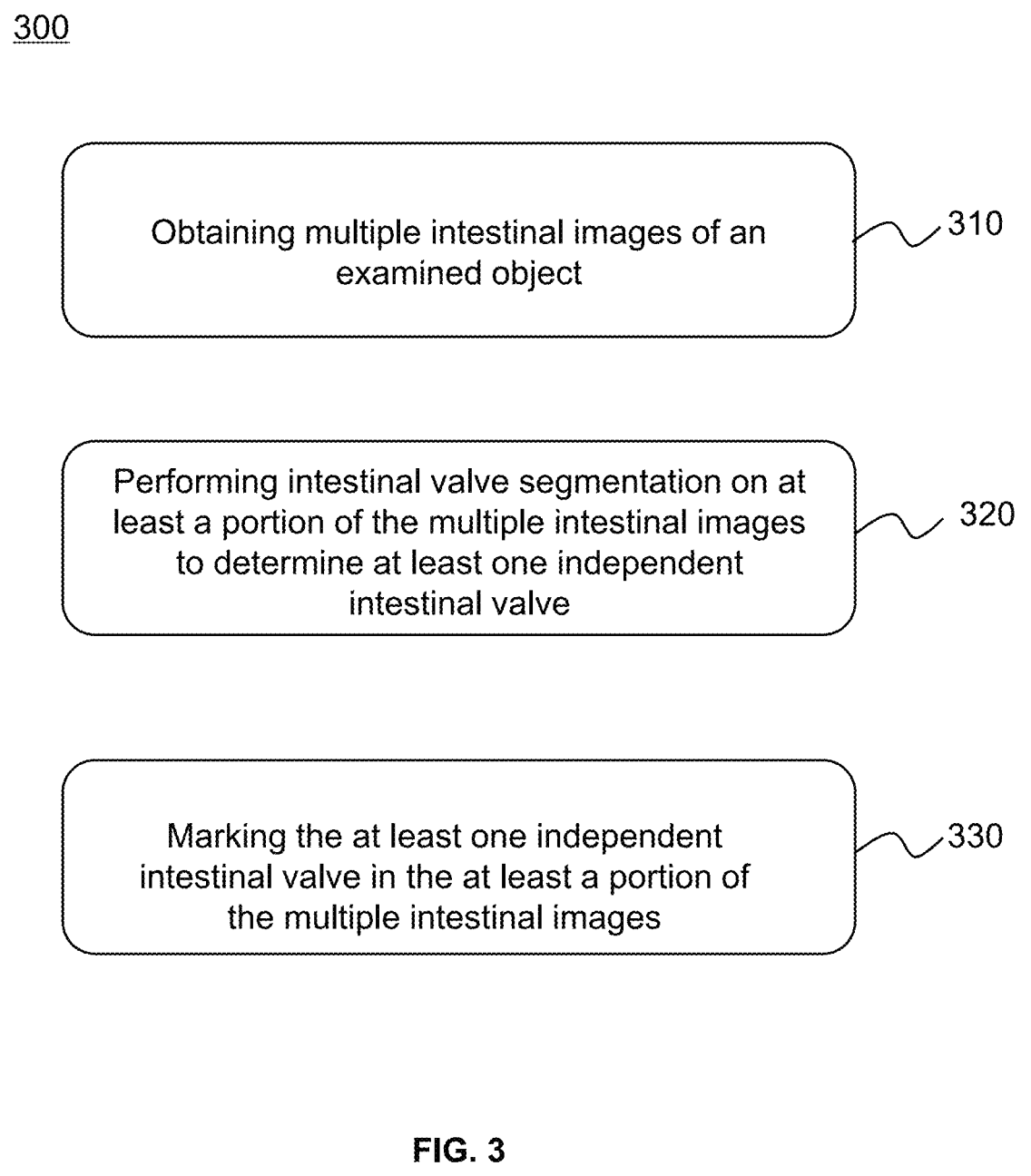

Obtaining multiple intestinal images of an examined object                    310

Performing intestinal valve segmentation on at least a portion of the multiple intestinal images to determine at least one independent intestinal valve                    320

Marking the at least one independent intestinal valve in the at least a portion of the multiple intestinal images                    330

Segmentation model    620

630

710

720-1          720-2          720-3          720-4          720-5          720-6

810

820

830-3

830-1

830-2

MARKING SYSTEMS, METHODS, DEVICES, AND STORAGE MEDIA FOR INTESTINAL VALVE IMAGING

CROSS-REFERENCE TO RELATED APPLICATION

This application claims priority to Chinese Patent Application No. 202310131554.4, filed on Feb. 6, 2023, the contents of which are hereby incorporated by reference.

TECHNICAL FIELD

The present disclosure relates to the technical field of medical image processing and, in particular, to marking systems, methods, devices, and storage media for intestinal valve imaging.

BACKGROUND

In colonoscopy, the count of intestinal valves in the whole intestine is large, and the morphology of the intestinal valves is diverse. Since the lens keeps moving or the angle of the lens is changed during the colonoscopy, the intestinal valves may change in morphology and/or distort, the efficacy for tracking and marking the intestinal valves may be relatively low.

Accordingly, it is necessary to provide a marking system, method, device, and storage medium for intestinal valve imaging to track and mark intestinal valves.

SUMMARY

According to an embodiment of the present disclosure, a system may be provided. The system may include at least one storage device including a set of instructions and at least one processor in communication with the at least one storage device. When executing the set of instructions, the at least one processor may be configured to cause the system to perform operations including: obtaining multiple intestinal images of an examined object; performing intestinal valve segmentation on at least a portion of the multiple intestinal images to determine at least one independent intestinal valve; and marking the at least one independent intestinal valve in the at least a portion of the multiple intestinal images.

In some embodiments, the at least one processor may be configured to cause the system to perform operations including: tracking the at least one independent intestinal valve segmented from the at least a portion of the multiple intestinal images. The marking the at least one independent intestinal valve in the at least a portion of the multiple intestinal images may include marking the at least one independent intestinal valve based on a tracking result of the at least one independent intestinal valve.

In some embodiments, the tracking the at least one independent intestinal valve segmented from the at least a portion of the multiple intestinal images may include: performing a first matching on the at least one independent intestinal valve segmented from the at least a portion of the intestinal images, and determining a same intestinal valve in the at least one independent intestinal valve; and performing a second matching on a first independent intestinal valve that fails to be matched in the first matching in the at least one independent intestinal valve, and determining a second intestinal valve in the at least one independent intestinal valve that is the same as the first independent intestinal valve.

In some embodiments, the performing a first matching on the at least one independent intestinal valve segmented from the at least a portion of the intestinal images, and determining a same intestinal valve in the at least one independent intestinal valve may include: determining an intersection over union (IOU) between an independent intestinal valve segmented from a current intestinal image of the multiple intestinal images and each independent intestinal valve segmented from N intestinal images previous to the current intestinal image; and determining, based on the IOU and a preset threshold, whether the independent intestinal valve segmented from the current intestinal image and the independent intestinal valve segmented from the previous N intestinal images are the same intestinal valve.

In some embodiments, the performing intestinal valve segmentation on at least a portion of the multiple intestinal images to determine at least one independent intestinal valve may include: segmenting, based on a segmentation model, the at least a portion of the multiple intestinal images to output an initial segmented image for each intestinal image of the at least a portion of the multiple intestinal images; determining whether an intestinal valve adhesion exists in the initial segmented image; and if the intestinal valve adhesion exists in the initial segmented image, segmenting the initial segmented image to determine the at least one independent intestinal valve.

In some embodiments, an image background, the at least one independent intestinal valve, and an edge of each of the at least one independent intestinal valve may be distinguished from each other in the initial segmented image.

In some embodiments, the mark of the at least one independent intestinal valve may include a first mark or a second mark. The first mark may be used to identify the at least one independent intestinal valve. The second mark may be used to label whether the at least one independent intestinal valve includes an independent intestinal valve including lesion.

In some embodiments, the at least one processor may be configured to cause the system to perform operations including: prompting a user when the at least one independent intestinal valve includes an independent intestinal valve including lesion.

In some embodiments, the marking the at least one independent intestinal valve in the at least a portion of the multiple intestinal images may include: numbering the at least one independent intestinal valve in an order according to a first appearance of the at least one independent intestinal valve in the at least a portion of the multiple intestinal images.

According to another aspect of the present disclosure, a method may be implemented on a computing device having at least one processor and at least one storage device. The method may include: obtaining multiple intestinal images of an examined object; performing intestinal valve segmentation on at least a portion of the multiple intestinal images to determine at least one independent intestinal valve; and marking the at least one independent intestinal valve in the at least a portion of the multiple intestinal images.

In some embodiments, the method may include: tracking the at least one independent intestinal valve segmented from the at least a portion of the multiple intestinal images. The marking the at least one independent intestinal valve in the at least a portion of the multiple intestinal images may include marking the at least one independent intestinal valve based on a tracking result of the at least one independent intestinal valve.

In some embodiments, the tracking the at least one independent intestinal valve segmented from the at least a portion of the multiple intestinal images may include: performing a first matching on the at least one independent intestinal valve segmented from the at least a portion of the intestinal images, and determining a same intestinal valve in the at least one independent intestinal valve; and performing a second matching on a first independent intestinal valve that fails to be matched in the first matching in the at least one independent intestinal valve, and determining a second intestinal valve in the at least one independent intestinal valve that is the same as the first independent intestinal valve.

In some embodiments, the performing a first matching on the at least one independent intestinal valve segmented from the at least a portion of the intestinal images, and determining a same intestinal valve in the at least one independent intestinal valve may include: determining an intersection over union (IOU) between an independent intestinal valve segmented from a current intestinal image of the multiple intestinal images and each independent intestinal valve segmented from N intestinal images previous to the current intestinal image; and determining, based on the IOU and a preset threshold, whether the independent intestinal valve segmented from the current intestinal image and the independent intestinal valve segmented from the previous N intestinal images are the same intestinal valve.

In some embodiments, the performing intestinal valve segmentation on at least a portion of the multiple intestinal images to determine at least one independent intestinal valve may include: segmenting, based on a segmentation model, the at least a portion of the multiple intestinal images to output an initial segmented image for each intestinal image of the at least a portion of the multiple intestinal images; determining whether an intestinal valve adhesion exists in the initial segmented image; and if the intestinal valve adhesion exists in the initial segmented image, segmenting the initial segmented image to determine the at least one independent intestinal valve.

In some embodiments, an image background, the at least one independent intestinal valve, and an edge of each of the at least one independent intestinal valve may be distinguished from each other in the initial segmented image.

In some embodiments, the mark of the at least one independent intestinal valve may include a first mark or a second mark. The first mark may be used to identify the at least one independent intestinal valve. The second mark may be used to label whether the at least one independent intestinal valve includes an independent intestinal valve including lesion.

In some embodiments, the method may include: prompting a user when the at least one independent intestinal valve includes an independent intestinal valve including lesion.

In some embodiments, the marking the at least one independent intestinal valve in the at least a portion of the multiple intestinal images may include: numbering the at least one independent intestinal valve in an order according to a first appearance of the at least one independent intestinal valve in the at least a portion of the multiple intestinal images.

According to another aspect of the present disclosure, a non-transitory computer readable medium may be provided. The non-transitory computer readable medium may include at least one set of instructions, wherein when executed by at least one processor of a computing device, the at least one set of instructions may cause the at least one processor to effectuate a method comprising: obtaining multiple intestinal images of an examined object; performing intestinal valve segmentation on at least a portion of the multiple intestinal images to determine at least one independent intestinal valve; and marking the at least one independent intestinal valve in the at least a portion of the multiple intestinal images.

In some embodiments, the method may include tracking the at least one independent intestinal valve segmented from the at least a portion of the multiple intestinal images. The marking the at least one independent intestinal valve in the at least a portion of the multiple intestinal images may include marking the at least one independent intestinal valve based on a tracking result of the at least one independent intestinal valve.

BRIEF DESCRIPTION OF THE DRAWINGS

The present disclosure will be further illustrated by way of exemplary embodiments, which will be described in detail by way of the accompanying drawings. These embodiments are not limiting, and in these embodiments the same numbering indicates the same structure wherein:

FIG. 2 is a block diagram illustrating an exemplary marking system for intestinal valve imaging according to some embodiments of the present disclosure;

FIG. 3 is a flowchart illustrating an exemplary marking process for intestinal valve imaging according to some embodiments of the present disclosure;

DETAILED DESCRIPTION

Figure 1:
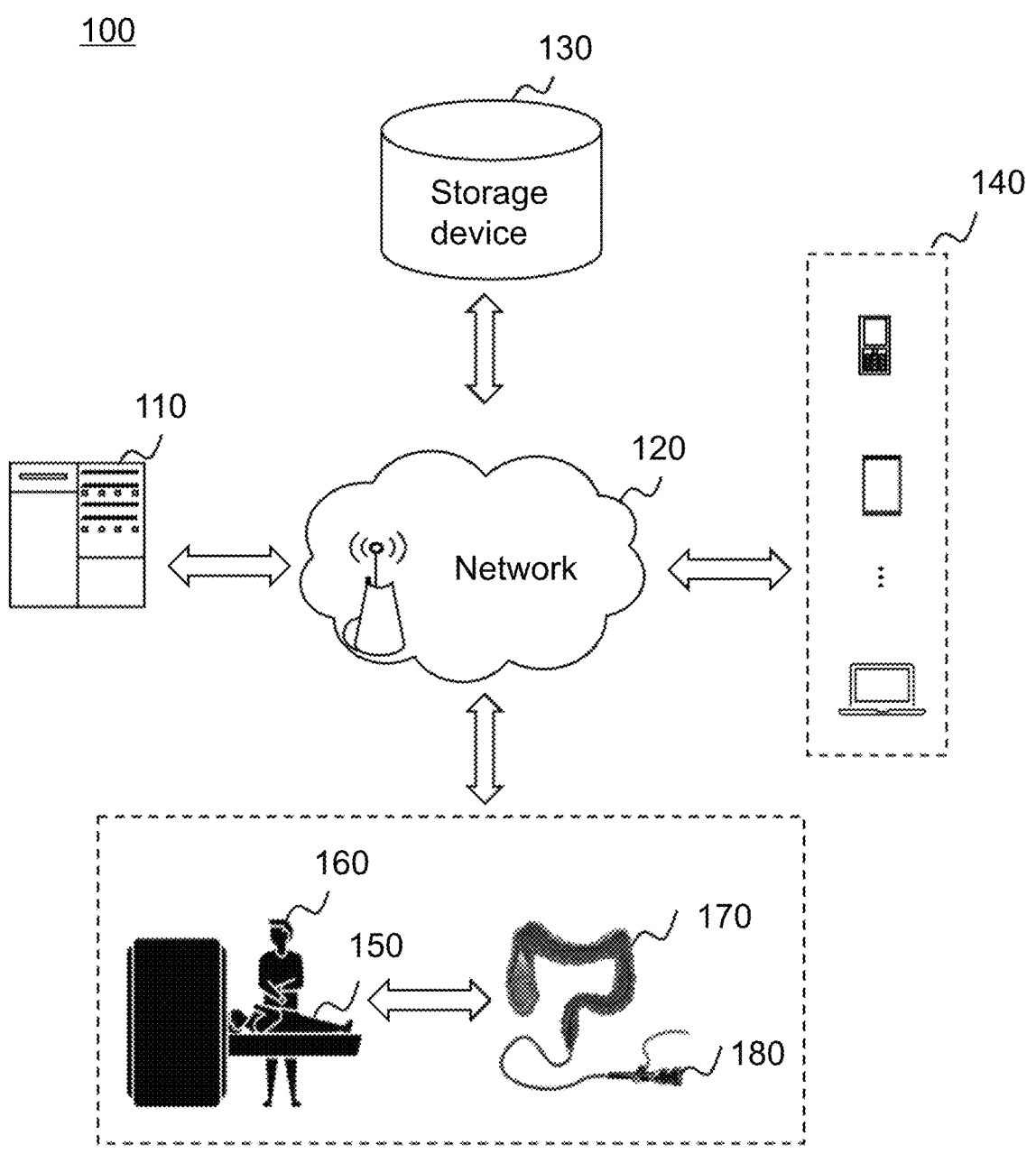
FIG. 1 is a schematic diagram illustrating an application scenario of a marking system for intestinal valve imaging according to some embodiments of the present disclosure.

The technical schemes of the present disclosure embodiments will be more clearly described below, and the accompanying drawings need to be configured in the description of the embodiments will be briefly described below. Obviously, the drawings in the following description are merely some examples or embodiments of the present disclosure, and will be applied to other similar scenarios according to these accompanying drawings without paying creative labor. Unless obviously obtained from the context or the context illustrates otherwise, the same numeral in the drawings refers to the same structure or operation.

It should be It should be understood that the "system," "device," "unit" and/or "module" used herein is a method for distinguishing different components, elements, components, parts or assemblies of different levels. However, if other words may achieve the same purpose, the words may be replaced by other expressions.

As shown in the present disclosure and claims, unless the context clearly prompts the exception, "a," "one," and/or "the" is not specifically singular, and the plural may be included. It will be further understood that the terms "comprise," "comprises," and/or "comprising," "include," "includes," and/or "including," when used in present disclosure, specify the presence of stated features, integers, steps, operations, elements, and/or components, but do not preclude the presence or addition of one or more other features, integers, steps, operations, elements, components, and/or groups thereof.

The flowcharts are used in present disclosure to illustrate the operations performed by the system according to the embodiment of the present disclosure. It should be understood that the preceding or following operations are not necessarily performed in order to accurately. Instead, the operations may be processed in reverse order or simultaneously. Moreover, one or more other operations may be added to the flowcharts. One or more operations may be removed from the flowcharts.

FIG. 1 is a schematic diagram illustrating an application scenario 100 of a marking system for intestinal valve imaging according to some embodiments of the present disclosure. As shown in FIG. 1, the application scenario 100 of the marking system for intestinal valve imaging may include a processing device 110, a network 120, a storage device 130, a terminal 140, an examined object 150, a user 160, an intestine 170, and a colonoscopy device 180. In some embodiments, at least a portion of the components in the application scenario 100 may be connected via the network 120 (e.g., a wireless connection, a wired connection, or a combination thereof) to achieve connection and/or communication with each other. For example, the processing device 110 may be connected to the storage device 130 via the network 120.

In some embodiments, the processing device 110 may process information and/or data related to the application scenario 100 of the marking system for intestinal valve imaging to perform one or more functions described in the present disclosure. For example, the processing device 110 may obtain multiple intestinal images of the examined object 150 based on the colonoscopy device 180, perform intestinal valve segmentation on at least a portion of the multiple intestinal images to determine at least one independent intestinal valve, and mark the at least one independent intestinal valve in the at least a portion of the multiple intestinal images. In some embodiments, the processing device 110 may include one or more processing engines (e.g., a single-chip processing engine or a multi-chip processing engine). Merely by way of example, the processing device 110 may include a central processing unit (CPU). The processing device 110 may process data, information, and/or processing results obtained from other devices or system components and execute program instructions based on the data, information, and/or processing results to perform one or more functions described in the present disclosure.

The network 120 may include any suitable network that facilitates information and/or data exchange of the marking system for intestinal valve imaging. The information and/or data may be exchanged between one or more components of the marking system for intestinal valve imaging (e.g., the processing device 110, the storage device 130, the terminal 140, the colonoscopy device 180) via the network 120. For example, the network 120 may send the multiple intestinal images obtained by the colonoscopy device 180 to the processing device 110. In some embodiments, the network 120 may be a wired network, a wireless network, or any combination thereof. In some embodiments, the network 120 may include one or more network access points. For example, the network 120 may include a wired or wireless network access point. In some embodiments, the network may have a point-to-point topology, a shared topology, a centralized topology, or the like, or any combination thereof.

The storage device 130 may be configured to store data, instructions, and/or any other information. In some embodiments, the storage device 130 may store data and/or information obtained from the processing device 110, the terminal 140, the colonoscopy device 180, etc. For example, the storage device 130 may store the multiple intestinal images, etc., obtained by the colonoscopy device 180. In some embodiments, the storage device 130 may be integrated into the processing device 110. In some embodiments, the storage device 130 may include a mass storage, a removable storage, or the like, or any combination thereof.

The terminal 140 may be a terminal device used by the user 160. The user 160 may be a person attended a colonoscopy. For example, the user 160 may be a doctor, a nurse, a technician, etc., performing the colonoscopy. In some embodiments, the terminal 140 may include a mobile device, a tablet computer, a laptop computer, or the like, or any combination thereof. In some embodiments, the mobile device may include a smartphone, a smart paging device, etc., or other smart devices. The terminal 140 may interact with other components in the application scenario 100 via the network 120. For example, the terminal 140 may receive the multiple intestinal images of the examined object 150 after the multiple intestinal images are marked, etc., from the processing device 110.

The examined object 150 may be an organism (e.g., a human, an animal, etc.) in need of a colonoscopy. For example, the examined object 150 may be an anorectal patient, a chemotherapy patient, a physical examiner, etc.

The intestine 170 may be an intestine of the examined object 150 in need of a colonoscopy. The intestine 170 may be a long and continuous tubular structure from the stomach to the anus of the examined object 150. For example, the intestine 170 may include a small intestine (e.g., duodenum, jejunum, ileum), a large intestine (e.g., ascending colon, transverse colon, descending colon, sigmoid colon, rectum), etc. In some embodiments, information related to the intestine 170 may be captured via the colonoscopy device 180 and transmitted via the network 120 to the processing device 110 and/or the terminal device 140.

Figure 12:
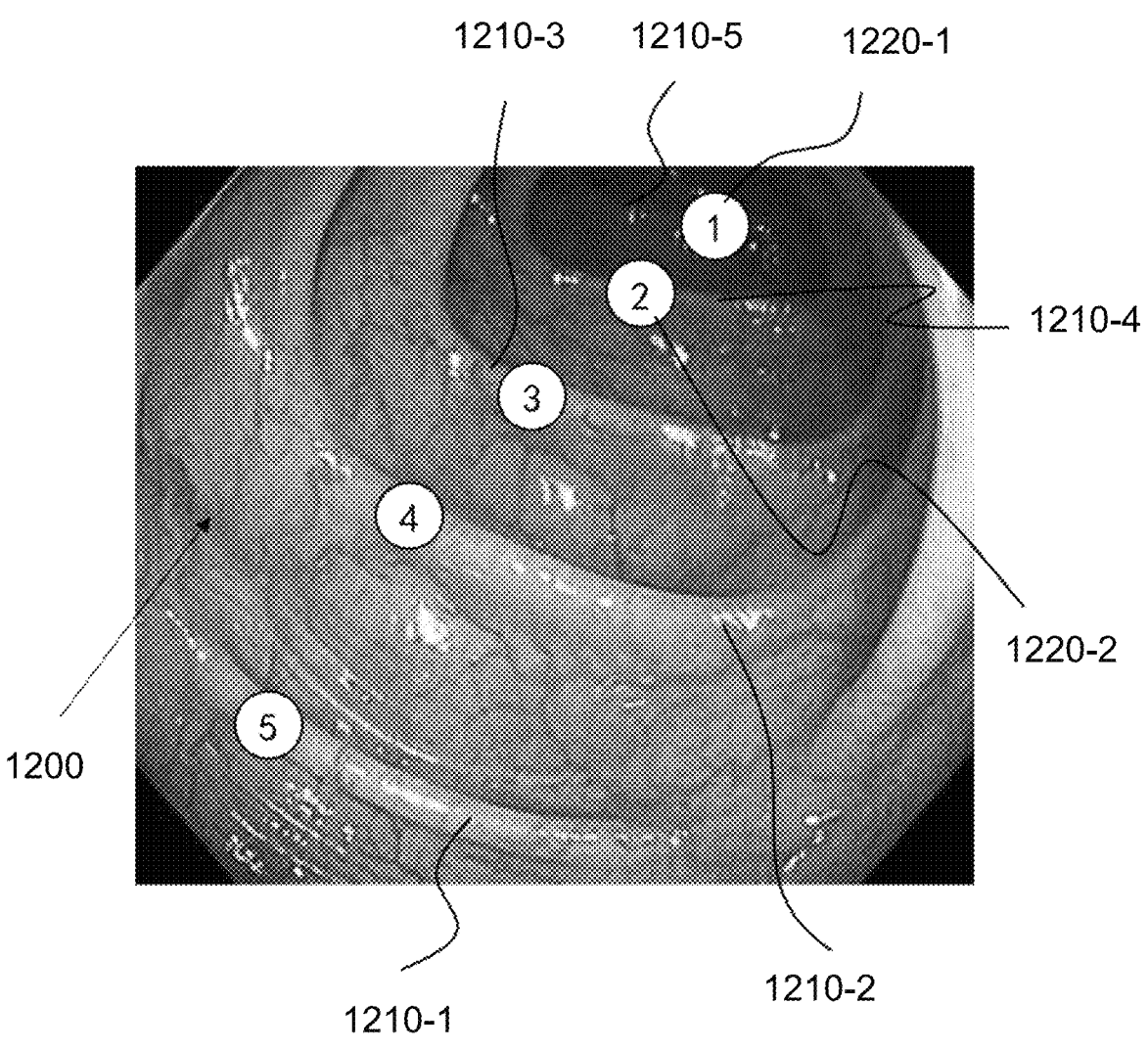
FIG. 12 is a schematic diagram illustrating an exemplary intestine according to some embodiments of the present disclosure.

FIG. 12 is a schematic diagram illustrating an exemplary intestine according to some embodiments of the present disclosure. As shown in FIG. 12, the intestine 1200 may include at least one independent intestinal valve (e.g., an independent intestinal valve 1210-1, an independent intestinal valve 1210-2, an independent intestinal valve 1210-3, an independent intestinal valve 1210-4, and an independent intestinal valve 1210-5). In some embodiments, the intestinal valve may be a folded portion of the intestine 170 that projects inwardly. For example, the intestinal valve may be a transverse or slightly oblique semilunar transverse mucosa fold in an inner wall of the intestine, also referred to as a rectal valve. The intestinal valve may project into an intestinal cavity with a concave surface upward and be in a left-right and up-and-down crossover arrangement. The colonoscopy device 180 may be a device for obtaining multiple intestinal images of the examined object 150. The colonoscopy device 180 may also be referred to as an intestine endoscopy device, primarily for acquisition of intestinal images of intestinal polyps, tumors, inflammatory diseases, etc. For example, the colonoscopy device 180 may include colonoscopy devices of different body parts, for example, a small bowel scope, a colonoscope, a sigmoidoscope, a proctoscope, etc. For example, the colonoscopy device 180 may include an image obtainment device (e.g., a camera), a manipulation instrument (e.g., a manipulation forceps), a wire, or the like. Merely by way of example, the colonoscopy device 180 may obtain the multiple intestinal images of the intestine 170 of the examined object 150 via the camera. The multiple intestinal images of the examined object 150 may be transmitted to the processing device 110 via the network 120.

It should be noted that the application scenario 100 of the marking system for intestinal valve imaging is provided for illustration purposes only and is not intended to limit the scope of the present disclosure. For those of ordinary skill in the art, various modifications or variations may be made based on the description of the present disclosure. For example, the application scenario 100 of the marking system for intestinal valve imaging may be implemented on other devices with similar or different functions. However, these variations and modifications may not depart from the scope of the present disclosure.

FIG. 2 is a block diagram illustrating an exemplary marking system 200 for intestinal valve imaging according to some embodiments of the present disclosure. In some embodiments, the marking system 200 for intestinal valve imaging may be implemented by the processing device 110. In some embodiments, the marking system 200 for intestinal valve imaging may include an intestinal image obtainment module 210, an intestinal image segmentation module 220, and an intestinal valve marking module 230.

The intestinal image obtainment module 210 may be configured to obtain multiple intestinal images of an examined object.

The intestinal image segmentation module 220 may be configured to perform intestinal valve segmentation on at least a portion of the multiple intestinal images to determine at least one independent intestinal valve. In some embodiments, the intestinal image segmentation module 220 may include a first image segmentation unit 221 and a second image segmentation unit 223. The first image segmentation unit 221 may be configured to segment the at least a portion of the multiple intestinal images based on a segmentation model to output an initial segmented image for each intestinal image of the at least a portion of the multiple intestinal images. The second image segmentation unit 223 may be configured to determine whether an intestinal valve adhesion exists in the initial segmented image. If the intestinal valve adhesion exists in the initial segmented image, the second image segmentation unit 223 may segment the initial segmented image to determine the at least one independent intestinal valve.

The intestinal valve marking module 230 may be configured to mark the at least one independent intestinal valve in the at least a portion of the multiple intestinal images. If the intestinal valve adhesion exists in the initial segmented image, the initial segmented image may be segmented to determine the at least one independent intestinal valve. In some embodiments, the intestinal valve marking module 230 may also be configured to number the at least one independent intestinal valve in an order according to a first appearance of the at least one independent intestinal valve in the at least a portion of the multiple intestinal images.

In some embodiments, the marking system 200 for intestinal valve imaging may further include an intestinal valve tracking module 240. The intestinal valve tracking module 240 may be configured to track the at least one independent intestinal valve segmented from the at least a portion of the multiple intestinal images. In some embodiments, the intestinal valve tracking module 240 may include an intestinal valve matching unit 241 and a tracker unit 243. The intestinal valve matching unit 241 may be configured to perform a first matching on the at least one independent intestinal valve segmented from the at least a portion of the intestinal images and determine a same intestinal valve in the at least one independent intestinal valve. The tracker unit 243 may be configured to perform a second matching on a first independent intestinal valve that fails to be matched in the first matching in the at least one independent intestinal valve, and determine a second intestinal valve in the at least one independent intestinal valve that is the same as the first independent intestinal valve. In some embodiments, the intestinal valve matching unit 241 may also be configured to: determine an intersection over union (IOU) between an independent intestinal valve segmented from a current intestinal image of the multiple intestinal images and each independent intestinal valve segmented from N intestinal images previous to the current intestinal image; and determine, based on the IOU and a preset threshold, whether the independent intestinal valve segmented from the current intestinal image and the independent intestinal valve segmented from the previous N intestinal images are the same intestinal valve.

In some embodiments, the intestinal valve marking module 230 may also be configured to mark the at least one independent intestinal valve based on a tracking result of the at least one independent intestinal valve.

In some embodiments, the marking system 200 for intestinal valve imaging may further include a prompting module 250. The prompting module 250 may be configured to prompt a user when the at least one independent intestinal valve includes an intestinal valve including lesion.

It should be noted that the above description of the marking system 200 for intestinal valve imaging and the modules is for descriptive convenience only and does not limit the present disclosure to the scope of the cited embodiments. It can be understood that it is possible for a person skilled in the art, with an understanding of the principle of the system, to make any combination of the modules or to form subsystems to connect to other modules without departing from the principle. In some embodiments, the intestinal image obtainment module 210, the intestinal image segmentation module 220, the intestinal valve marking module 230, the intestinal valve tracking module 240, and the prompting module 250 disclosed in FIG. 2 may be different modules in one system, or one module may implement the functions of two or more of the above modules. For example, the modules may share a common storage module, or each module may have its own storage module. Variations such as these may be within the scope of protection of the present disclosure.

FIG. 3 is a flowchart illustrating an exemplary marking process 300 for intestinal valve imaging according to some embodiments of the present disclosure. In some embodiments, the marking process 300 for intestinal valve imaging may be performed by the processing device 110 or the marking system 200 for intestinal valve imaging. For example, the marking process 300 for intestinal valve imaging may be stored in a form of a program or instructions in the storage device 130. The marking process 300 for intestinal valve imaging may be implemented when the processing device 110 or the marking system 200 for intestinal valve imaging executes the instructions. The operations of the marking process 300 for intestinal valve imaging presented below may be illustrative. In some embodiments, one or more additional operations not described and/or not discussed may be utilized to complete the process 300. Besides, the order of operations of the marking process 300 for intestinal valve imaging illustrated in FIG. 3 and described below is not limiting. As shown in FIG. 3, the marking process 300 for intestinal valve imaging may include the operations described below.

In 310, multiple intestinal images of an examined object may be obtained. In some embodiments, operation 310 may be performed by the intestinal image obtainment module 210.

The examined object may include an organism (e.g., a human, an animal) in need of a colonoscopy. For example, the examined object may include an anorectal patient, a chemotherapy patient, a physical examiner, etc.

An intestinal image may refer to an image of an interior of an intestine of the examined object. In some embodiments, the intestinal image obtainment module 210 may obtain the multiple intestinal images via the colonoscopy device 180. The multiple intestinal images may include intestinal images obtained at multiple consecutive time points. For more information about the colonoscopy device 180, please refer to FIG. 1 and its related descriptions, which may not be repeated herein.

In some embodiments, an intestinal image may be a two-dimensional (2D) image or a three-dimensional (3D) image in a format such as joint photographic experts group (JPEG), tagged image file format (TIFF), graphics interchange format (GIF), etc.

In some embodiments, the multiple intestinal images of the examined object may be obtained from the colonoscopy device 180. In some embodiments, the multiple intestinal images of the examined object may be obtained from a storage device (e.g., the storage device 130).

In 320, intestinal valve segmentation may be performed on at least a portion of the multiple intestinal images to determine at least one independent intestinal valve. In some embodiments, operation 320 may be performed by the intestinal image segmentation module 220.

The intestine may include the at least one independent intestinal valve. An independent intestinal valve may be a portion of the intestine projecting inwardly. For more information about the intestine and an intestinal valve, please refer to FIG. 1 and its related descriptions, which may not be repeated herein.

The intestinal valve segmentation may refer to an operation for determining a position of an independent intestinal valve in an intestinal image, and the independent intestinal valve may be a complete intestinal valve. Still taking FIG. 12 as an example, the intestinal valve segmentation may be an operation for determining a position of the independent intestinal valve 1210-1, a position of the independent intestinal valve 1210-2, a position of the independent intestinal valve 1210-3, a position of the independent intestinal valve 1210-4, and a position of the independent intestinal valve 1210-5 in the intestine 1200.

In some embodiments, the intestinal image segmentation module 220 may perform the intestinal valve segmentation on each of the multiple intestinal images to determine the at least one independent intestinal valve, or may perform the intestinal valve segmentation on only a portion of the multiple intestinal images to determine the at least one independent intestinal valve.

In some embodiments, the intestinal image segmentation module 220 may perform the intestinal valve segmentation on an intestinal image by any means to determine the at least one independent intestinal valve. For example, the intestinal image segmentation module 220 may segment the intestinal image based on a manual operation. As another example, the intestinal image segmentation module 220 may perform the intestinal valve segmentation on the intestinal image by an intestinal valve segmentation model to determine the at least one independent intestinal valve. The intestinal valve segmentation model may include a fully convolutional network (FCN) model, a segmentation network (SegNet) model, a mask-region convolutional neural network (Mask-RCNN) model, etc. The intestinal image segmentation module 220 may train a preliminary intestinal valve segmentation model based on a plurality of first training samples to determine the intestinal valve segmentation model. Each first training sample may include a sample intestinal image of a sample intestine, and a label of the first training sample may include a position of each independent intestinal valve in the sample intestinal image. In some embodiments, the intestinal image segmentation module 220 may use the trained preliminary intestinal valve segmentation model, or a portion thereof, that meets a preset condition after the training, as the intestinal valve segmentation model for performing the intestinal valve segmentation on the intestinal image. As used herein, the preset condition may include a convergence of a loss function, a value of a loss function smaller than a preset value, a count of iterations greater than a preset count, etc. Based on the loss function of the model training or after a preset count of iterative update, the trained preliminary intestinal valve segmentation model may be determined.

In some embodiments, the intestinal image segmentation module 220 may segment the at least a portion of the multiple intestinal images based on a segmentation model to output an initial segmented image for each intestinal image of the at least a portion of the multiple intestinal images. The intestinal image segmentation module 220 may also determine whether an intestinal valve adhesion exists in the initial segmented image. If the intestinal valve adhesion exists in the initial segmented image, the intestinal image segmentation module 220 may segment the initial segmented image to determine the at least one independent intestinal valve. For more information about determining the at least one independent intestinal valve based on the segmentation model, please refer to FIG. 4 and its related descriptions, which may not be repeated here.

In 330, the at least one independent intestinal valve may be marked in the at least a portion of the multiple intestinal images. In some embodiments, operation 330 may be performed by the intestinal valve marking module 230.

The marking may include an operation for adding an identification to the independent intestinal valve(s) in the at least a portion of the multiple intestinal images. In some embodiments, the intestinal valve marking module 230 may add any form of identification to the independent intestinal valve(s) in the intestinal image(s). For example, the identification may include a character (e.g., a Chinese character, an English letter), an image, a symbol, etc.

In some embodiments, the intestinal valve marking module 230 may mark the at least one independent intestinal valve by any means. For example, the intestinal valve marking module 230 may mark the at least one independent intestinal valve according to a preset rule. The preset rule may include a rule of marking the independent intestinal valve(s) according to position(s) of the independent intestinal valve(s), a rule of marking the independent intestinal valve(s) according to size(s) of the independent intestinal valve(s), etc. Still taking FIG. 12 as an example, for each intestinal image, the intestinal valve marking module 230 may mark independent intestinal valves in the intestinal image according to a size order from smallest to largest. When Arabic numerals are used, the smallest independent intestinal valve 1210-5 may be marked with a first mark number 1220-1 "①," the next smallest independent intestinal valve 1210-4 may be marked with a second mark number 1220-2 "②," and the remaining independent intestinal valves may be marked successively.

In some embodiments, the intestinal valve marking module 230 may number the at least one independent intestinal valve in an order according to a first appearance of the at least one independent intestinal valve in the at least a portion of the multiple intestinal images.

In some embodiments, during the manipulation of the colonoscopy device 180 by the user to obtain the multiple intestinal images of the examined object, the user drives the colonoscopy device 180 to move to change a field of view of the colonoscopy device 180, which in turn causes that different intestinal images have different independent intestinal valves. The intestinal valve marking module 230 may first determine a specific intestinal image in which each independent intestinal valve first appears, and number the at least one independent intestinal valve according to a sequential order of the specific intestinal image in which each independent intestinal valve first appears. For example, for ten intestinal images, an independent intestinal valve A may first appear in the first image, an independent intestinal valve B may first appear in the third image, and an independent intestinal valve C may first appear in the fifth image. Then the independent intestinal valve A may appear earliest and the independent intestinal valve C may appear latest in the ten intestinal images. The intestinal valve marking module 230 may use Arabic numerals (from smallest to largest) to mark the independent intestinal valve A, the independent intestinal valve B, and the independent intestinal valve C sequentially in the ten intestinal images, according to the time (from earliest to latest) of the first appearance.

In some embodiments, by numbering the at least one independent intestinal valve in the order according to the first appearance of the at least one independent intestinal valve in the at least a portion of the multiple frames of the intestinal images, the user can quickly determine the position(s) of the independent intestinal valve(s) in corresponding intestinal image(s).

In some embodiments, the mark of the at least one independent intestinal valve may include a first mark and/or a second mark. The first mark may be used to identify the at least one independent intestinal valve. The second mark may be used to label whether the at least one independent intestinal valve includes an intestinal valve including lesion.

The lesion may be a portion of the intestine that has pathological changes, e.g., a portion of the intestine that is cancerous, a portion where a polyp grows, a portion where tumor grows, etc.

The first mark and the second mark may have different forms. For example, the first mark may include a green pattern and the second mark may include a red pattern. As another example, the first mark may include an Arabic numeral and the second mark may include an English letter.

In some embodiments, the intestinal valve marking module 230 may identify whether the at least one independent intestinal valve includes an intestinal valve including lesion.

For example, the intestinal valve marking module 230 may process an image of an independent intestinal valve to determine whether the independent intestinal valve includes lesion. The intestinal valve marking module 230 may add the first mark to the image of the independent intestinal valve if the independent intestinal valve is determined to include no lesion. The intestinal valve marking module 230 may add the second mark to the image of the independent intestinal valve if the independent intestinal valve is determined to include lesion. Merely by way of example, the intestinal valve marking module 230 may process the image of the independent intestinal valve by a lesion identification model to determine whether the independent intestinal valve includes lesion. The image identification model may include a convolutional neural network (CNN), a deep neural network (DNN), a recurrent neural network (RNN), a multi-layer neural network (MLP), or the like, or any combination thereof. The intestinal valve marking module 230 may train a preliminary lesion identification model by a plurality of second training samples to determine the lesion identification model. Each second training sample may include a sample image of a sample independent intestinal valve, and a label of the second training sample may include whether the sample independent intestinal valve is an intestinal valve including lesion. The preliminary lesion identification model may be trained based on the second training samples in a similar manner as how the preliminary intestinal valve segmentation model is trained based on the first training samples, more descriptions of which are not repeated here.

As another example, the intestinal valve marking module 230 may determine an independent intestinal valve including lesion and add the second mark for the independent intestinal valve based on the order of the first appearance of the independent intestinal valve in the at least a portion of the multiple intestinal images. Merely by way of example, the intestinal valve marking module 230 may obtain that an intestinal valve including a preset lesion is the second independent intestinal valve appeared in the at least a portion of the multiple intestinal images in advance from the processing device 110, the storage device 130, the terminal 140, or an external data source. The intestinal valve marking module 230 may identify the second independent intestinal valve from the at least a portion of the multiple intestinal images and add the second mark for the second independent intestinal valve once the second independent intestinal valve is identified.

In some embodiments, by adding the first mark to intestinal valves including no lesion and the second mark to intestinal valves including lesion, the user can quickly distinguish the intestinal valve including no lesion and the intestinal valve including lesion, thereby improving the user's diagnostic efficiency.

In some embodiments, the intestinal valve marking module 230 may prompt the user when the at least one independent intestinal valve includes an independent intestinal valve including lesion. The intestinal valve marking module 230 may prompt the user when the at least one independent intestinal valve includes an independent intestinal valve including lesion by any means, for example, by voice, by displaying a prompt text in an intestinal image, or other means.

In some embodiments, by prompting the user that the at least one independent intestinal valve includes an independent intestinal valve including lesion, the user may quickly notice the independent intestinal valve and observe the morphology of the independent intestinal valve, and there is no need for the user to manually determine whether the independent intestinal valve including lesion is already present.

In some embodiments, the intestinal valve tracking module 240 may track the at least one independent intestinal valve segmented from the at least a portion of the multiple intestinal images. The intestinal valve marking module 230 may mark the at least one independent intestinal valve based on a tracking result of the at least one independent intestinal valve. For more information about tracking the at least one independent intestinal valve segmented from the at least one independent intestinal valve and marking the at least one independent intestinal valve based on the tracking result, please refer to FIG. 5 and its related descriptions, which may not be repeated here.

In some embodiments, by performing the intestinal valve segmentation on the at least a portion of the multiple intestinal images to determine the at least one independent intestinal valve, and marking the at least one independent intestinal valve, the user can quickly determine the positions and the count of intestinal valves in the intestinal images.

It should be noted that the above description of the marking process 300 for intestinal valve imaging is for descriptive convenience only, and does not limit the present disclosure to the scope of the embodiments cited. For a person skilled in the art, various amendments and changes can be made to the marking process 300 for intestinal valve imaging under the guidance of the present disclosure. However, these amendments and changes may remain within the scope of the present disclosure.

Figure 4:
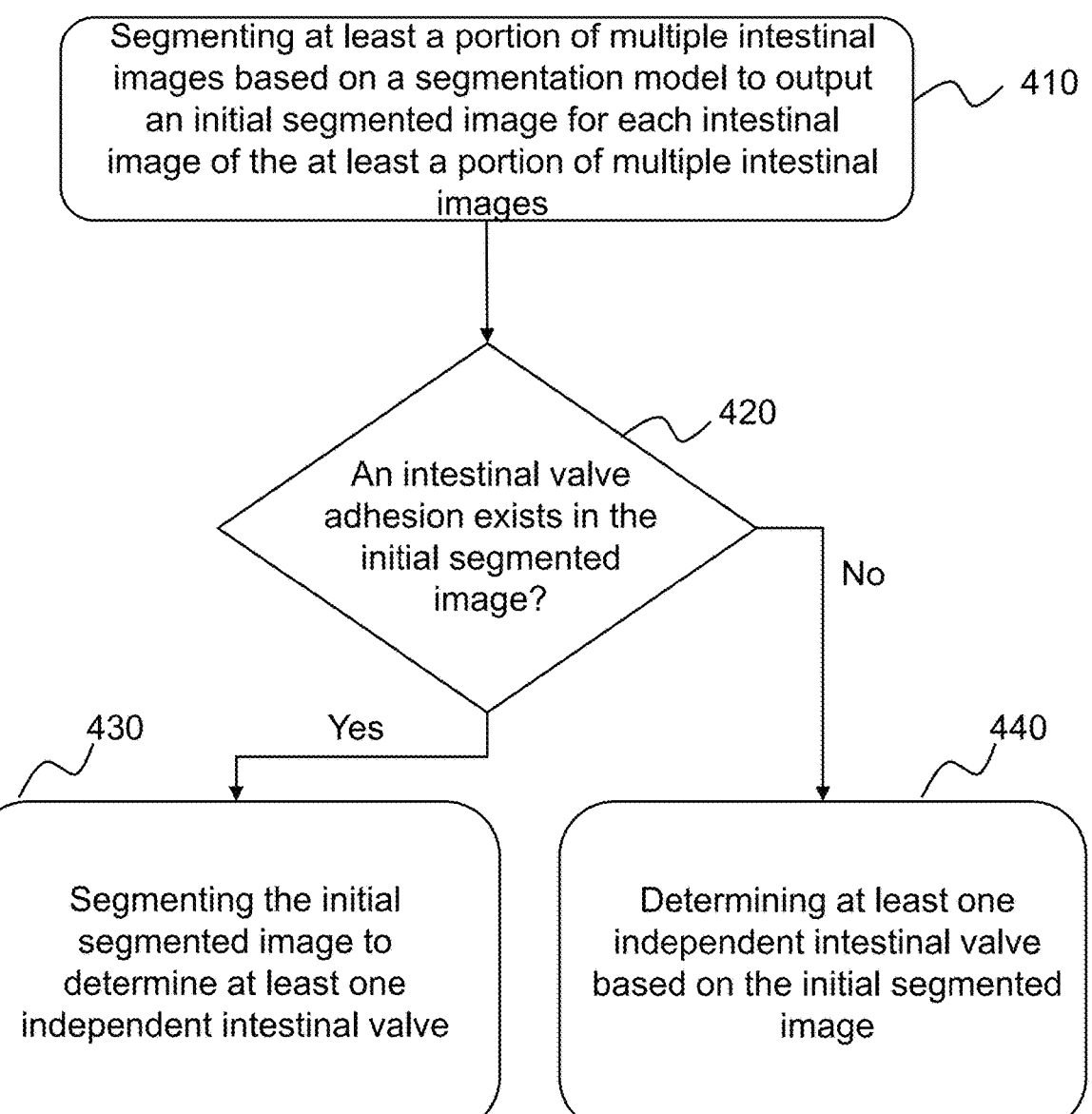
FIG. 4 is a flowchart illustrating an exemplary process for determining at least one independent intestinal valve based on a segmentation model according to some embodiments of the present disclosure.

FIG. 4 is a flowchart illustrating an exemplary process for determining at least one independent intestinal valve based on a segmentation model according to some embodiments of the present disclosure. In some embodiments, the marking process 400 for intestinal valve imaging may be performed by the processing device 110 or the marking system 200 for intestinal valve imaging. For example, the marking process 400 for intestinal valve imaging may be stored in a form of a program or instructions in the storage device 130. The marking process 400 for intestinal valve imaging may be implemented when the processing device 110 or the marking system 200 for intestinal valve imaging executes the instructions. The operations of the marking process 400 for intestinal valve imaging presented below may be illustrative. In some embodiments, one or more additional operations not described and/or not discussed may be utilized to complete the process 400. Besides, the order of operations of the marking process 400 for intestinal valve imaging illustrated in FIG. 4 and described below is not limiting. As shown in FIG. 4, the marking process 400 for intestinal valve imaging may include the operations described below.

In 410, at least a portion of multiple intestinal images may be segmented based on a segmentation model to output an initial segmented image for each intestinal image of the at least a portion of multiple intestinal images. In some embodiments, operation 410 may be performed by the intestinal image segmentation module 220.

Figure 6:
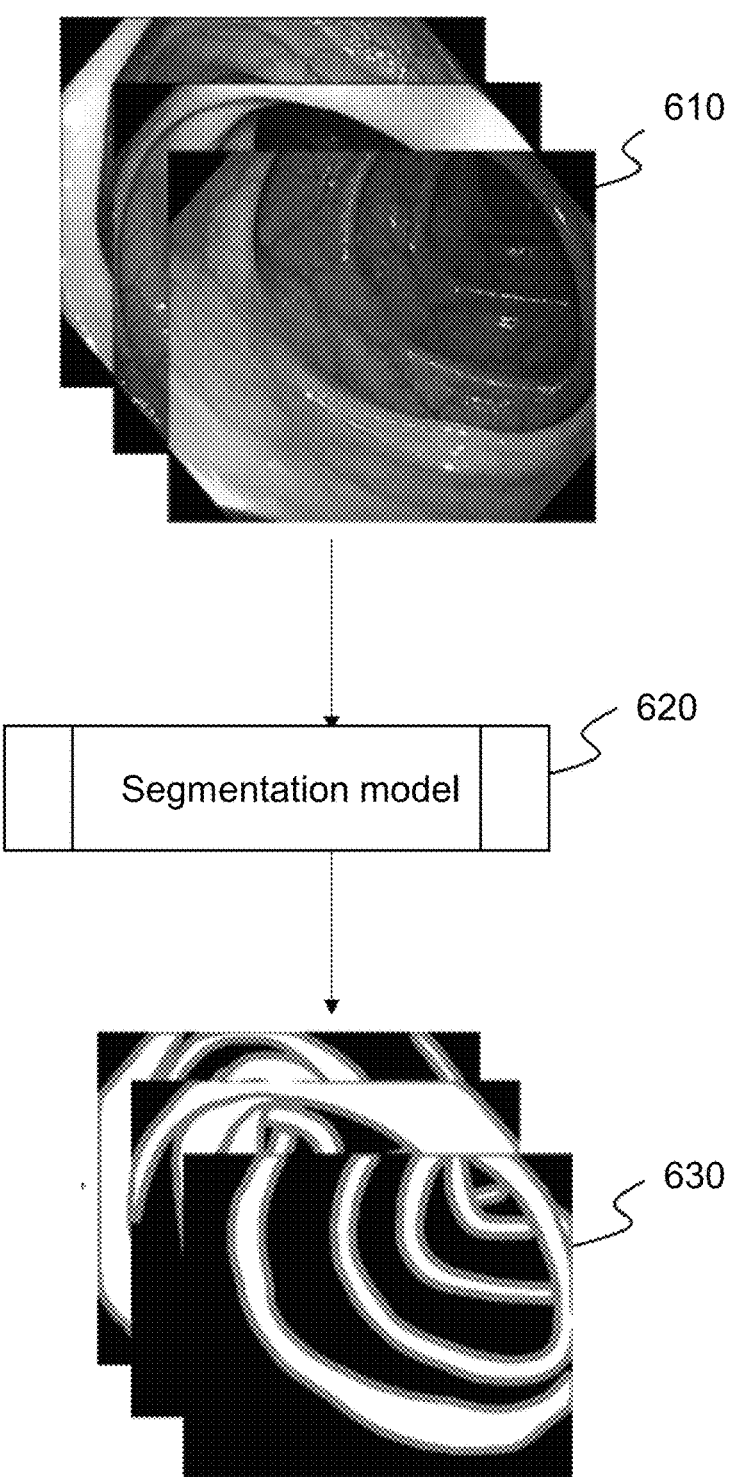
FIG. 6 is a schematic diagram illustrating an initial segmented image determined based on a segmentation model according to some embodiments of the present disclosure.

The segmentation model may include a machine learning model used to segment the intestinal images to determine edge(s) of independent intestinal valve(s). FIG. 6 is a schematic diagram illustrating an initial segmented image determined based on a segmentation model according to some embodiments of the present disclosure. As shown in FIG. 6, in some embodiments, an input of a segmentation model 620 may include an intestinal image set 610. The intestinal image set 610 may be all or a portion of the multiple intestinal images. An output of the segmentation model 620 may be an initial segmented image set 630. The initial segmented image set 630 may include an initial segmented image corresponding to each of intestinal images in the intestinal image set 610. In some embodiments, the segmentation model may include a convolutional neural network (CNN), a deep neural network (DNN), a recurrent neural network (RNN), a multilayer neural network (MLP), or the like, or any combination thereof.

In some embodiments, the segmentation model may include an Unet model. The Unet model may extract deep feature(s) (e.g., abstract information, essential information) and shallow feature(s) (e.g., local image detail features such as texture) of the intestinal image(s) through multi-scale feature recognition, and fuse the deep feature(s) and shallow feature(s) through a skip connection, which can effectively preserve local details and global abstract information in the intestinal image(s).

The initial segmented image may be an image corresponding to the intestinal image in which an edge of each independent intestinal valve is determined based on the segmentation model. In some embodiments, the initial segmented image may be a binarized image.

In some embodiments, an image background, the at least one independent intestinal valve, and the edge(s) of each of the independent intestinal valve(s) may be distinguished in the initial segmented image. For example, a grayscale value of the image background, a grayscale value of the independent intestinal valve(s), and a grayscale value of the edge(s) of the independent intestinal valve(s) in the initial segmented image may be different. Merely by way of example, a pixel value of the image background may be 0, a pixel value of the independent intestinal valve(s) may be 255, and a pixel value of the edge(s) of the independent intestinal valve(s) may be 100.

In some embodiments, the intestinal image segmentation module 220 may train a preliminary segmentation model based on a plurality of third training samples to determine the segmentation model. Each third training sample may include a sample intestinal image, and a label of the third training sample may include a sample initial segmented image corresponding to the sample intestinal image. In some embodiments, the intestinal image segmentation module 220 may thicken edge(s) of intestinal valve(s) in the sample initial segmented image by any means, so as to emphasize the learning of the edge(s) of the intestinal valve(s) by the preliminary segmentation model and ensure that the trained preliminary segmentation model can extract the edge more correctly. For example, the edge(s) of the intestinal valve(s) in the sample initial segmented image may be thickened manually. The training of the preliminary segmentation model based on the plurality of third training samples may be similar to the training of the preliminary intestinal valve segmentation model based on the plurality of first training samples, more description of which may not be repeated here.

In 420, whether an intestinal valve adhesion exists in the initial segmented image may be determined. In some embodiments, operation 420 may be performed by the intestinal image segmentation module 220.

The intestinal valve adhesion may refer to that at least two intestinal valves cannot be segmented into independent intestinal valves in the initial segmented image. Problems such as blurred imaging, motion blur, complex noise, the presence of foreign object obstacles such as fecal droppings in the intestine, or the angle of the lens may cause that at least two intestinal valves in the intestinal image are too close to each other and the edges between adjacent intestinal valves are relatively blurred, and intestinal valve adhesion may appear.

Figure 7:
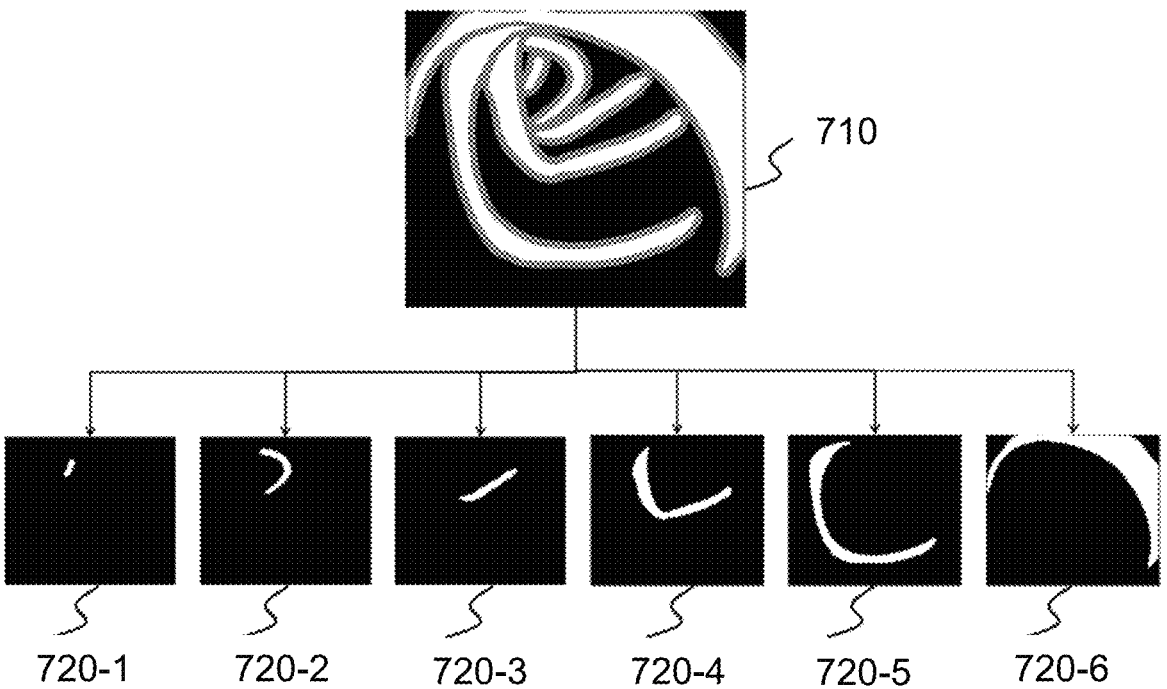
FIG. 7 is a schematic diagram illustrating exemplary determined intestinal valve mask images determined based on an initial segmented image according to some embodiments of the present disclosure.

In some embodiments, the intestinal image segmentation module 220 may generate multiple intestinal valve mask images based on contours of intestinal valves in the initial segmented image. Each intestinal valve mask image may include a mask of one intestinal valve determined based on a contour of one closed intestinal valve. FIG. 7 is a schematic diagram illustrating exemplary determined intestinal valve mask images determined based on an initial segmented image according to some embodiments of the present disclosure. As shown in FIG. 7, an initial segmented image 710 may include contours of a plurality of intestinal valves. For a contour of each closed intestinal valve, a corresponding intestinal valve mask image may be determined, thereby generating an intestinal valve mask image 720-1, an intestinal valve mask image 720-2, an intestinal valve mask image 720-3, an intestinal valve mask image 720-4, an intestinal valve mask image 720-5, and an intestinal valve mask image 720-6.

In some embodiments, the intestinal image segmentation module 220 may determine whether the intestinal valve adhesion exists in the initial segmented image by any means.

For example, for each intestinal valve mask image, the intestinal image segmentation module 220 may determine a pixel count percentage of an intestinal valve. If the pixel count percentage of the intestinal valve is greater than a preset percentage threshold (e.g., 30%, 50%, etc.), it may be determined that the intestinal valve adhesion exists in the initial segmented image.

Figure 9:
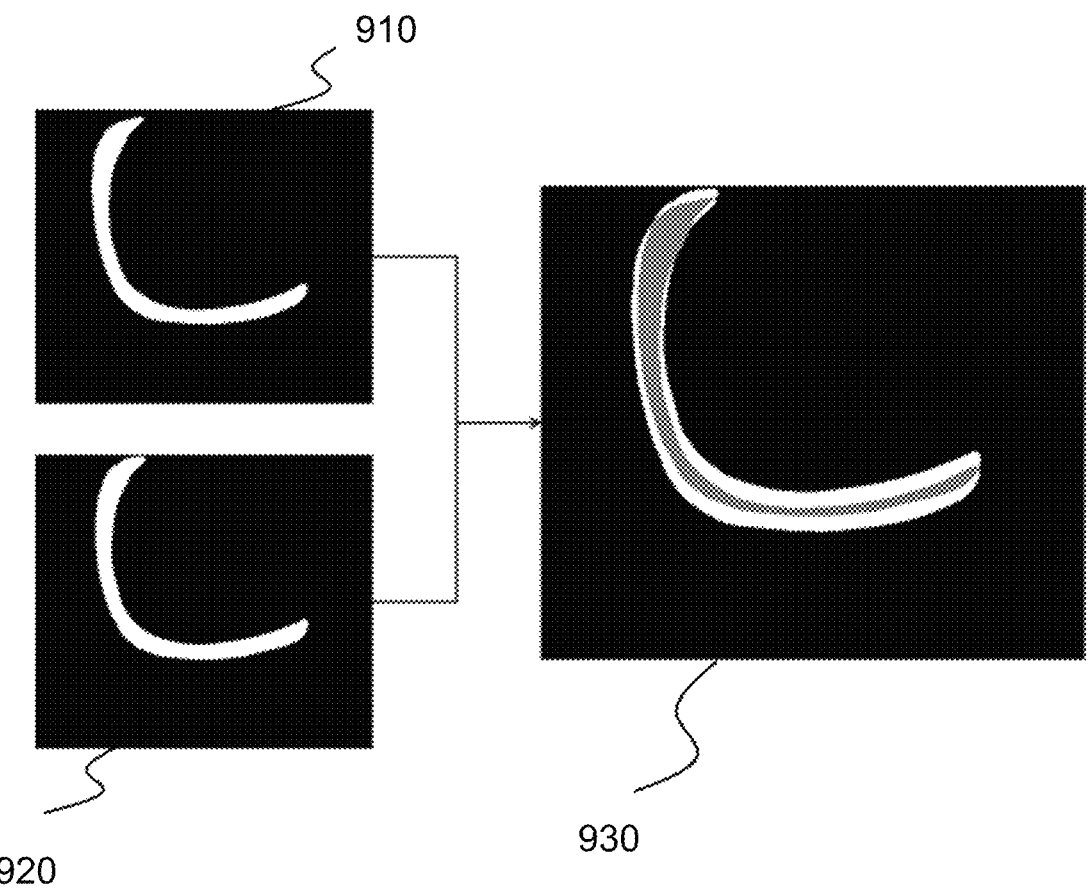
FIG. 9 is a schematic diagram illustrating method for determining an intersection over union (IOU) according to some embodiments of the present disclosure.

As another example, the intestinal image segmentation module 220 may first determine an intersection over union (IOU) between each intestinal valve mask image of the initial segmented image of the current image and each intestinal valve mask image of the initial segmented image of an image previous to the current image, respectively. If the IOU between at least two of the intestinal valve mask images of the previous image and the intestinal valve mask images of the current image is greater than a preset IOU threshold (e.g., 30%, 50%, etc.), it may be determined that the intestinal valve adhesion exists in the intestinal valve mask images of the current image, i.e., the intestinal valve adhesion may exist in the initial segmented image of the current image. For example, a plurality of intestinal valve mask images may be determined based on the initial segmented image of the previous image. If the IOU between the intestinal valve mask images of the current image and two or more intestinal valve mask images of the previous image is greater than a first preset IOU threshold, it may be determined that the intestinal valve adhesion exists in the initial segmented image of the current image. As used herein, the IOU between an intestinal valve mask image of the current image and an intestinal valve mask image of the previous image may include a ratio of the intersection to the union between the intestinal valve mask image of the current frame and the intestinal valve mask image of the previous image. For example, FIG. 9 is a schematic diagram illustrating method for determining an IOU according to some embodiments of the present disclosure. As shown in FIG. 9, in a fusion image 930 of an intestinal valve mask image 910 of the current image and an intestinal valve mask image 920 of the previous image, the gray area may represent the intersection between the intestinal valve mask image 910 of the current image and the intestinal valve mask image 920 of the previous image. The sum of the white area and the gray area may represent the union between the intestinal valve mask image 910 of the current image and the intestinal valve mask image 920 of the previous image. The IOU of the intestinal valve mask image 910 of the current image and the intestinal valve mask image 920 of the previous image may be the ratio of the gray area to the sum of the white area and the gray area.

Figure 8:
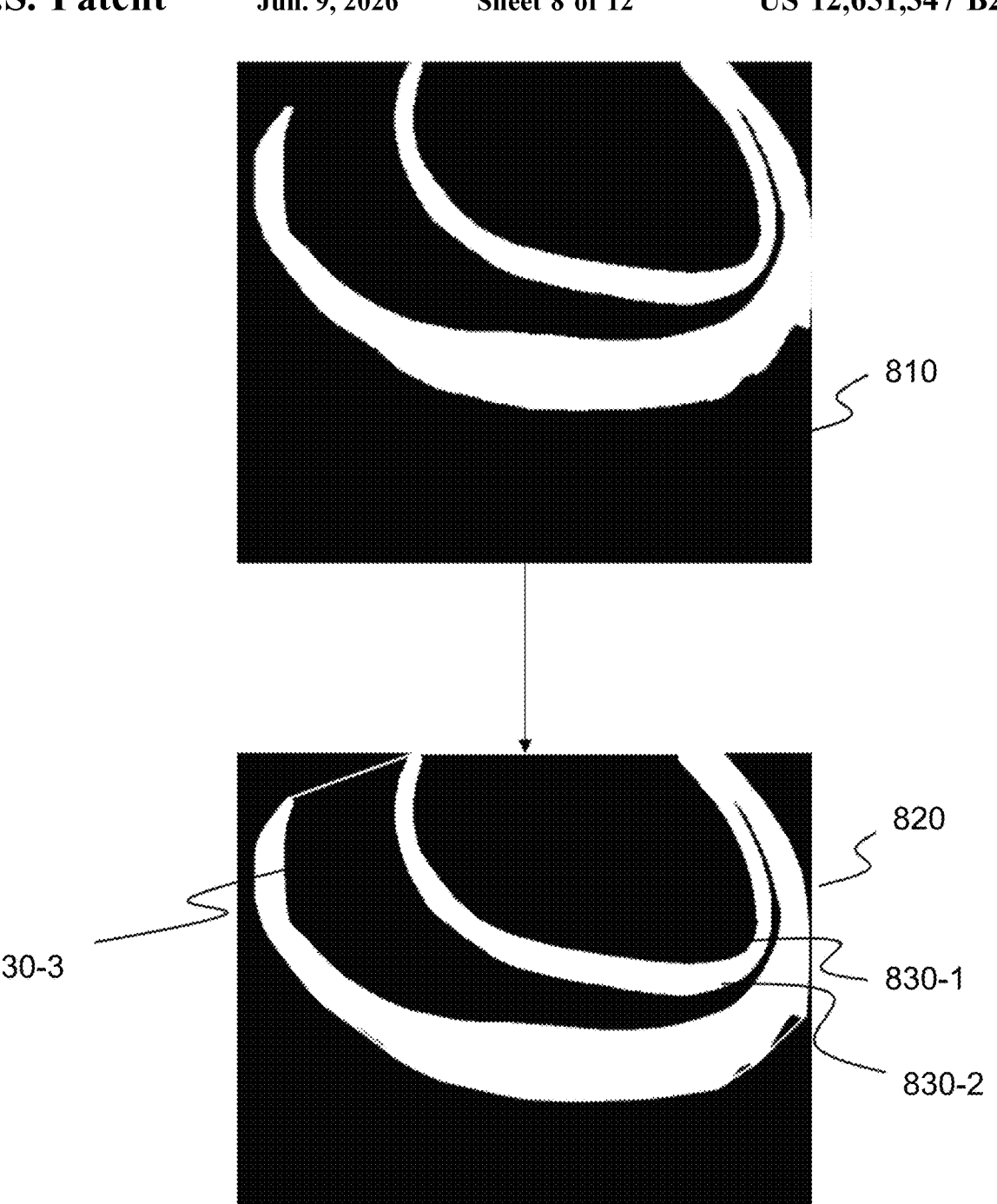
FIG. 8 is a schematic diagram illustrating a contour convex hull according to some embodiments of the present disclosure.

In some embodiments, if it is determined that the intestinal valve adhesion exists in the initial segmented image of the current image based on the IOU, the intestinal image segmentation module 220 may determine a contour convex hull of the intestinal valve mask image of the initial segmented image of the current image based on a convex hull algorithm. The intestinal valve may be wrapped as a closed space. If multiple internal contours exist in the closed space, it may be determined that an intestinal valve adhesion exists in the intestinal valve mask image of the current image, i.e., there is the intestinal valve adhesion exists in the initial segmented image of the current image. In some embodiments, if there are multiple inner contours with large areas in the closed space, it may be determined that the intestinal valve adhesion exists in the intestinal valve mask image of the current image. FIG. 8 is a schematic diagram illustrating a contour convex hull according to some embodiments of the present disclosure. Merely by way of example, as shown in FIG. 8, the intestinal image segmentation module 220 may determine the contour convex hull of an intestinal valve mask image 810 based on the convex hull algorithm to generate an intestinal valve mask image 820 after the contour convex hull determination. The intestinal valve mask image 820 after the contour convex hull determination may include an inner contour 830-1, an inner contour 830-2, and an inner contour 830-3. The intestinal image segmentation module 220 may determine that an intestinal valve adhesion exists in the intestinal valve mask image of the current image, i.e., the intestinal valve adhesion exists in the initial segmented image of the current image.

In some embodiments, whether the intestinal valve adhesion exists in the initial segmented image may be accurately determined based on the IOU and the contour convex hull.

In some embodiments, operation 430 may be performed if the intestinal image segmentation module 220 determines that the intestinal valve adhesion exists in the initial segmented image; operation 440 may be performed if the intestinal image segmentation module 220 determines that the intestinal valve adhesion does not exist in the initial segmented image.

In 430, the initial segmented image may be segmented to determine at least one independent intestinal valve. In some embodiments, operation 430 may be performed by the intestinal image segmentation module 220.

In some embodiments, the intestinal image segmentation module 220 may segment the initial segmented image in any manner to determine the at least one independent intestinal valve.

For example, the intestinal image segmentation module 220 may segment the intestinal valve mask image including the intestinal valve adhesion to determine an intestinal valve mask image of each independent intestinal valve through a manual operation.

Figure 10:
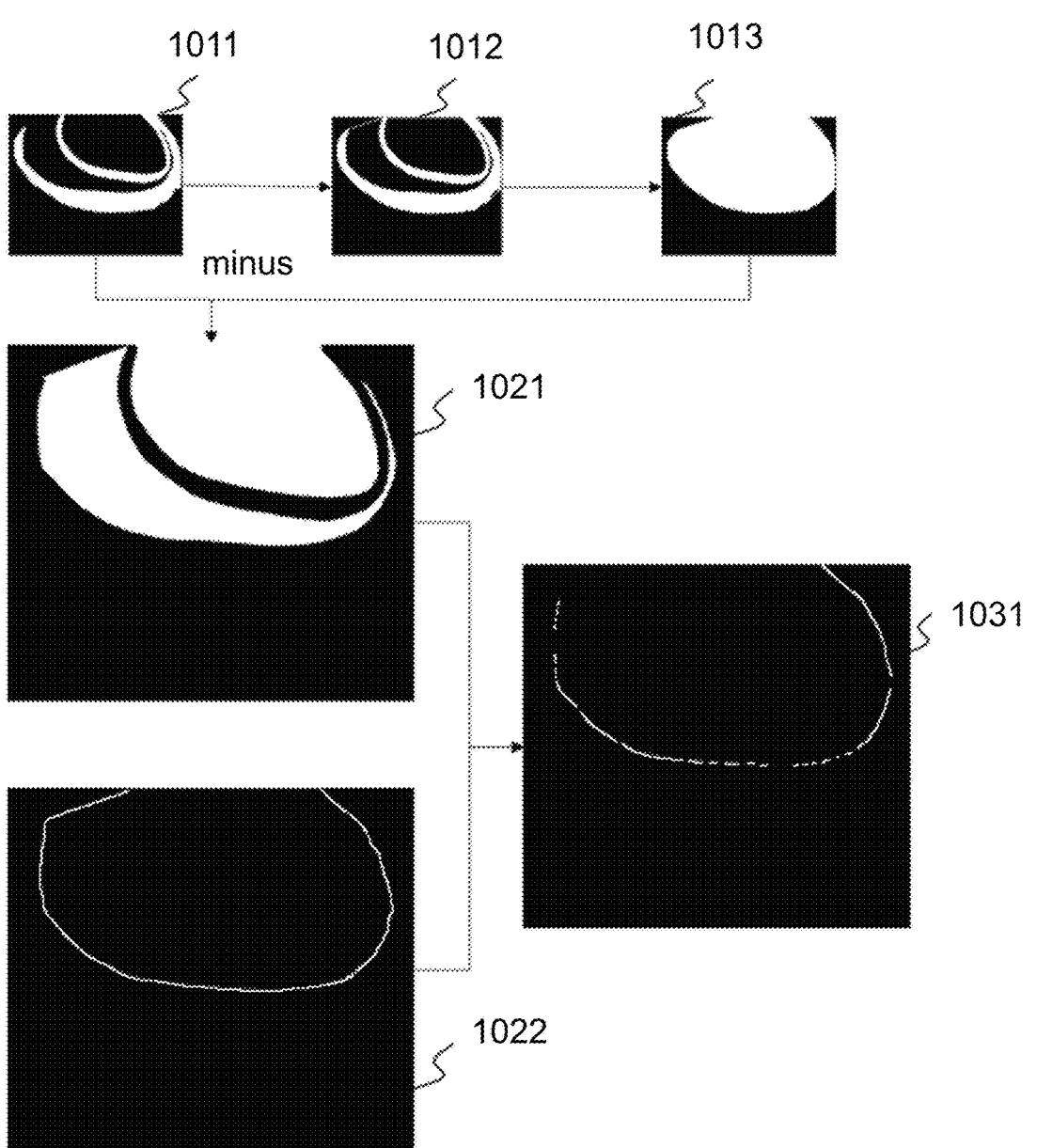
FIG. 10 is a schematic diagram illustrating an exemplary process for segmenting an initial segmented image according to some embodiments of the present disclosure.

As another example, FIG. 10 is a schematic diagram illustrating an exemplary process for segmenting an initial segmented image according to some embodiments of the present disclosure. As shown in FIG. 10, for an intestinal valve mask image 1011 including the intestinal valve adhesion, the intestinal image segmentation module 220 may first determine the contour convex hull of the intestinal valve mask image 1011 based on a convex hull algorithm. An intestinal valve mask image 1012 may refer to an image after the contour convex hull determination. A convex hull image 1013 corresponding to the intestinal valve mask image 1012 after the contour convex hull determination may be determined. The intestinal image segmentation module 220 may use the grayscale values of pixels of the convex hull image 1013 to subtract the grayscale values of pixels of the intestinal valve mask image 1011 to determine an inner contour image 1021. A convex contour image 1022 may be determined based on the convex contour in the inner contour image 1021. Further, the image segmentation module 220 may subtract the grayscale values of the pixels of an overlapping portion from the grayscale values of the pixels of the convex contour image 1022 to determine a segmentation line image 1031. The segmentation line image 1031 may include multiple line segments. The pixel values of the overlapping portion may include the grayscale values of the pixels of an overlapping portion between the convex contour image 1022 and the inner contour image 1021.

Figure 11:
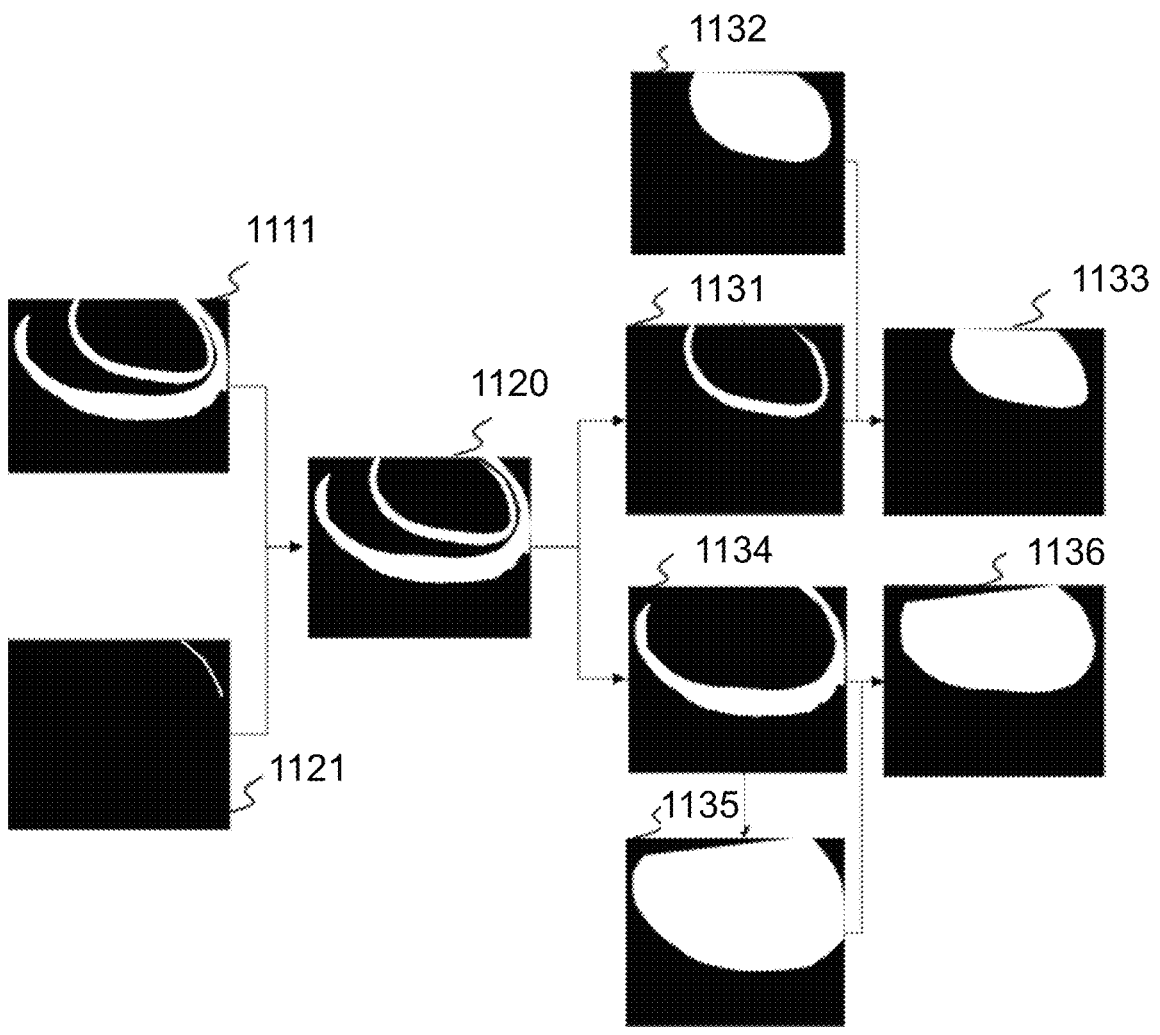
FIG. 11 is a schematic diagram illustrating an exemplary process for segmenting an initial segmented image to determine at least one independent intestinal valve according to some embodiments of the present disclosure.

FIG. 11 is a schematic diagram illustrating an exemplary process for segmenting an initial segmented image to determine at least one independent intestinal valve according to some embodiments of the present disclosure. As shown in FIG. 11, for each line segment, the image segmentation module 220 may determine a post-cut mask image 1120 after an intestinal valve mask image 1111 including the intestinal valve adhesion is cut by a line segment mask image 1121. The post-cut mask image 1120 may include two independent masks including a first independent mask image 1131 and a second independent mask image 1134. A first independent mask convex hull image 1132 of the first independent mask image 1131 and a second independent mask convex hull image 1135 of the second independent mask image 1134 may be determined. A first independent mask inner contour image 1133 may be determined by subtracting the gray values of the pixels of the first independent mask image 1131 from the gray values of the pixels of the first independent mask convex image 1132. A second independent mask inner contour image 1136 may be determined by subtracting the grayscale values of the pixels of the second independent mask convex image 1135 from the grayscale values of the pixels of the second independent mask image 1134. A fitness value of the intestinal valve mask image cut by the line segment (i.e., the post-cut mask image 1120) may be determined based on the first independent mask inner contour image 1133 and the second independent mask inner contour image 1136. The fitness value may be determined by the equation below:

$$\text{Fitness} = \frac{\text{Sum\_Area}}{\text{AbsDifference\_Area}} = \frac{\text{Area}_{InCnt1} + \text{Area}_{InCnt2}}{\text{abs}(\text{Area}_{InCnt1} - \text{Area}_{InCnt2})};$$

where Sum\_Area is the area of an intersection of a mask (i.e. white area) in the first independent mask inner contour image 1133 and the second independent mask inner contour image 1136, AbsDifference\_Are is an absolute value of the difference between the area of the mask in the first independent mask inner contour image 1133 and the area of the mask in the second independent mask inner contour image 1136, $\text{Area}_{InCnt1}$ is the area of the mask in the first independent mask inner contour image 1133, $\text{Area}_{InCnt2}$ is the area of the mask in the second independent mask inner contour image 1136, and abs $(\text{Area}_{InCnt1} - \text{Area}_{InCnt2})$ is the absolute value of $(\text{Area}_{InCnt1} - \text{Area}_{InCnt2})$.

In some embodiments, the image segmentation module 220 may use the line segment with the largest fitness value as the best line segment, and segment the intestinal valve mask image including the intestinal valve adhesion based on the best line segment, thereby determining the intestinal valve mask image of the independent intestinal valve.

In some embodiments, the intestinal image segmentation module 220 may determine the position of each independent intestinal valve in the intestinal image based on the position of the mask in the intestinal valve mask image corresponding to each independent intestinal valve. Thus the at least one independent intestinal valve may be determined.

In some embodiments, by determining multiple line segments and separately determining the fitness value corresponding to each line segment, the optimal segmentation line that can effectively segment the intestinal valve mask image including the intestinal valve adhesion may be more accurately determined. Thus the intestinal valve mask image including the intestinal valve adhesion can be more accurately segmented to determine the intestinal valve mask image of the independent intestinal valve.

In 440, at least one independent intestinal valve may be determined based on the initial segmented image. In some embodiments, operation 440 may be performed by the intestinal image segmentation module 220.

In some embodiments, the intestinal image segmentation module 220 may generate an intestinal valve mask image for each independent intestinal valve based on the initial segmented image. The intestinal image segmentation module 220 may determine the position of each independent intestinal valve in the intestinal image based on the position of the mask in the intestinal valve mask image of the independent intestinal valve, thereby determining the at least one independent intestinal valve.

In some embodiments, problems such as blurred imaging, motion blur, complex noise, the presence of foreign object obstacles such as fecal droppings and fecal water in the intestine, or the angle of the lens may cause that at least two intestinal valves in the intestinal image are too close to each other, the contours between adjacent intestinal valves are blurred. The intestinal valve adhesion may exist. The at least a portion of the multiple the intestinal images may be first segmented based on the segmentation model to output the initial segmented image for each intestinal image of the at least a portion of the multiple the intestinal images. The at least one independent intestinal valve may be determined relatively quickly when no intestinal valve adhesion exists. By determining whether the intestinal valve adhesion exists in the initial segmented image and segmenting the initial segmented image when the intestinal valve adhesion exists in the initial segmented image, the at least one independent intestinal valve can still be determined when the intestinal valve adhesion exists, and it is convenient to mark the independent intestinal valve(s).

It should be noted that the above description of the marking process 400 for intestinal valve imaging is for descriptive convenience only, and does not limit the present disclosure to the scope of the cited embodiments. Various amendments and modifications can be made to the marking process 400 for intestinal valve imaging for a person skilled in the art under the guidance of the present disclosure. However, these amendments and modifications remain within the scope of the present disclosure.

Figure 5:
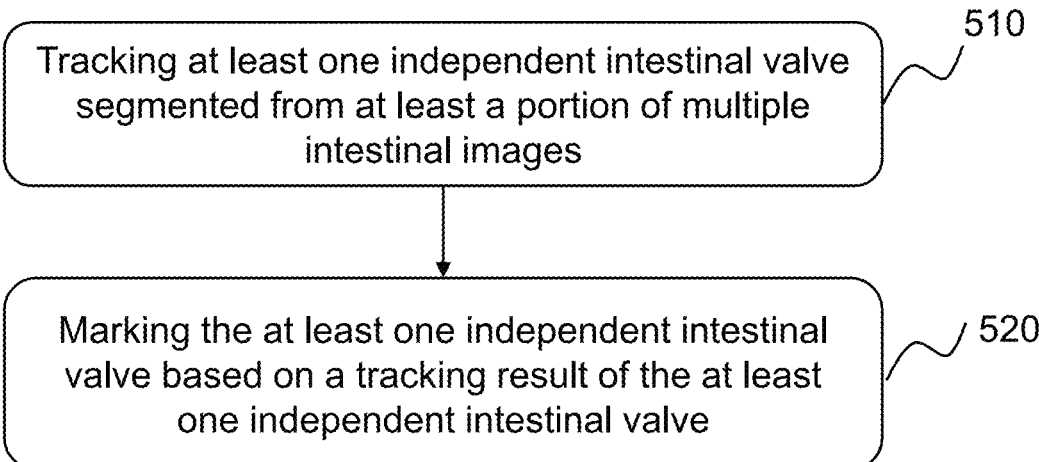
FIG. 5 is a flowchart illustrating an exemplary process for tracking and marking at least one segmented independent intestinal valve according to some embodiments of the present disclosure.

FIG. 5 is a flowchart illustrating an exemplary process for tracking and marking at least one segmented independent intestinal valve according to some embodiments of the present disclosure. In some embodiments, the marking process 500 for intestinal valve imaging may be performed by the processing device 110 or the marking system 200 for intestinal valve imaging. For example, the marking process 500 for intestinal valve imaging may be stored in a form of a program or instructions in the storage device 130, and the marking process 500 for intestinal valve imaging may be implemented when the processing device 110 or the marking system 200 for intestinal valve imaging executes the instructions. The operations of process 500 presented below may be illustrative. In some embodiments, one or more additional operations not depicted and/or not discussed may be utilized to complete the process 500. Besides, the order of operations of the marking process 500 for intestinal valve imaging illustrated in FIG. 5 and described below is not limiting. As shown in FIG. 5, the marking process 500 for intestinal valve imaging may include the operations described below.

In 510, at least one independent intestinal valve segmented from at least a portion of multiple intestinal images may be tracked. In some embodiments, operation 510 may be performed by the intestinal valve tracking module 240.

The tracking of the at least one segmented independent intestinal valve may refer to determining the same independent intestinal valve that appears in at least two images of the intestinal images. In some embodiments, the intestinal valve tracking module 240 may track the at least one segmented independent intestinal valve in any manner.

For example, the intestinal valve tracking module 240 may determine a position difference between a position of a particular independent intestinal valve in one image of the multiple intestinal images and a position of a particular independent intestinal valve in another image of the multiple intestinal images. If the position difference is less than a preset position difference threshold, the two independent intestinal valves may be determined to be the same independent intestinal valve.

In some embodiments, the intestinal valve tracking module 240 may perform a first matching on the at least one independent intestinal valve segmented from the at least a portion of the multiple intestinal images. The intestinal valve tracking module 240 may determine an intestinal valve that appears multiple times in the at least one independent intestinal valve. The intestinal valve tracking module 240 may also perform a second matching on a first independent intestinal valve that fails to be matched in the first matching in the at least one independent intestinal valve, and determine a second intestinal valve that is the same as the first independent intestinal valve. As used herein, if it is determined that an intestinal valve appears only once in the at least one independent intestinal valve, the intestinal valve may be deemed as failing to be matched in the first matching.

In some embodiments, the intestinal valve tracking module 240 may determine an IOU between an independent intestinal valve segmented from the current intestinal image of the multiple images and each independent intestinal valve segmented from N intestinal image(s) previous to the current intestinal image. The intestinal valve tracking module 240 may determine, based on the IOU and a preset threshold, whether the independent intestinal valve segmented from the current intestinal image and an independent intestinal valve segmented from the previous N intestinal image(s) are the same intestinal valve. As used herein, N is a positive integer. For more information about the IOU, please refer to FIG. 9 and its related descriptions, which may not be repeated here.

In some embodiments, for a particular independent intestinal valve of the current intestinal image, the intestinal valve tracking module 240 may first determine the IOU between the intestinal valve mask image of the particular independent intestinal valve and the intestinal valve mask image of each independent intestinal valve in the previous N intestinal image(s), and determine a maximum value of the IOU(s). If the maximum value of the IOU(s) is greater than a preset threshold (also referred to as a second preset IOU threshold (e.g., 30%, 50%, etc.)), it may be determined that the independent intestinal valve in the previous N intestinal image(s) corresponding to the maximum value of the IOU is the same intestinal valve as the particular independent intestinal valve of the current intestinal image. If the IOU(s) between the intestinal valve mask image(s) of the independent intestinal valve(s) in the previous N intestinal image(s) and the intestinal valve mask image of the particular independent intestinal valve of the current intestinal image are all greater than the second preset IOU threshold, the intestinal valve tracking module 240 may determine that the independent intestinal valve(s) in the previous N intestinal image(s) are different segments of the particular independent intestinal valve of the current intestinal image.

In some embodiments, if the IOU between the particular independent intestinal valve of the current intestinal image and the intestinal valve mask image of each of the independent intestinal valve(s) in any of the previous N intestinal image(s) are all less than the second preset IOU threshold, it may be determined that the first matching of the particular independent intestinal valve of the current intestinal image fails.

In some embodiments, by determining the IOU between the independent intestinal valve segmented from the current intestinal image and each independent intestinal valve segmented from the previous N intestinal image(s) of the current intestinal image, and determining whether the independent intestinal valve segmented from the current intestinal image and each independent intestinal valve segmented from the previous N intestinal image(s) are the same intestinal valve based on the IOU and the preset threshold, the valve tracking may be achieved without interruption during the colonoscopy even if an intestinal valve is not completely segmented due to a doctor's operation, intestinal foreign body obstruction occurs, or the field of view is incomplete caused by the lens switch, thereby improving the robustness of the overall tracking algorithm, and enabling the user to quickly locate the independent intestinal valve that needs to be viewed according to the previous colonoscopy result when the object is examined for the second time. For example, in a last colonoscopy result of the examined object, user A may determine that the independent intestinal valve marked as "3" in the intestine of the examined object is an independent intestinal valve including lesion. Then in the second colonoscopy, user A or user B can quickly determine the independent intestinal valve including lesion based on the last colonoscopy result and an identification of the independent intestinal valve, thereby improving the efficiency of the second colonoscopy.

In some embodiments, the intestinal valve tracking module 240 may perform the second matching, via channel and spatial reliability tracking (CRST), on the independent intestinal valve that fails to be matched in the first matching, to determine a same intestinal valve in the at least one independent intestinal valve as the independent intestinal valve that fails to be matched in the first matching. The intestinal valve tracking module 240 may perform the second matching for the independent intestinal valve that fails to be matched in the first matching in the current intestinal image based on the previous images of the multiple intestinal images via the CRST, to determine whether the same independent intestinal valve exists in the previous images of the intestinal images. When the second matching is performed, it may be still determined that the same independent intestinal valve does not exist in the previous images of the intestinal images, then the independent intestinal valve of the current intestinal image may be determined as a new intestinal valve.

In some embodiments, the first matching may be performed on the at least one segmented independent intestinal valve to determine the same intestinal valve in the at least one independent intestinal valve, and then the second matching may be performed on the first independent intestinal valve in the at least one independent intestinal valve that fails to be matched in the first matching to determine the second intestinal valve in the at least one independent intestinal valve that is the same as the first independent intestinal valve. Therefore, the same independent intestinal valve and the new intestinal valve in the multiple the intestinal images can be determined more accurately.

In 520, the at least one independent intestinal valve may be marked based on a tracking result of the at least one independent intestinal valve. In some embodiments, operation 520 may be performed by the intestinal valve marking module 230.

In some embodiments, for the same independent intestinal valve(s) in the multiple intestinal images, the intestinal valve marking module 230 may mark the same independent intestinal valve in the multiple intestinal images using a same identification.

In some embodiments, if the intestinal valve tracking module 240 determines that the independent intestinal valves in the previous N intestinal image(s) are different segments of a particular independent intestinal valve in the current intestinal image, the same identification may be used to mark the different segments of the particular independent intestinal valve in the previous N intestinal image(s) and the count of the independent intestinal valve(s) may be updated.

In some embodiments, for a newly appeared independent intestinal valve, the intestinal valve marking module 230 may mark the newly appeared independent intestinal valve with a new identification and update the count of the independent intestinal valve(s).

In some embodiments, by tracking the at least one independent intestinal valve segmented from the at least a portion of the multiple intestinal images, and marking the at least one independent intestinal valve based on the tracking result of the at least one independent intestinal valve using the same identification for the same independent intestinal valve in different images of the intestinal images, whether a new independent intestinal valve is appeared may be determined more accurately, facilitating determining of the count of independent intestinal valve(s) in real-time.

It should be noted that the above description of process 500 is intended to be exemplary and illustrative only, and does not limit the scope of application of this present disclosure. Various amendments and changes can be made to process 500 for those skilled in the art under the guidance of this present disclosure. However, these amendments and changes may remain within the scope of the present disclosure.

The basic concepts have been described above, apparently, in detail, as will be described above, and do not constitute limitations of the disclosure. Although there is no clear explanation here, those skilled in the art may make various modifications, improvements, and modifications of present disclosure. This type of modification, improvement, and corrections are recommended in present disclosure, so the modification, improvement, and the amendment remain in the spirit and scope of the exemplary embodiment of the present disclosure.

At the same time, present disclosure uses specific words to describe the embodiments of the present disclosure. As "one embodiment," "an embodiment," and/or "some embodiments" means a certain feature, structure, or characteristic of at least one embodiment of the present disclosure. Therefore, it is emphasized and should be appreciated that two or more references to "an embodiment" or "one embodiment" or "an alternative embodiment" in various parts of present disclosure are not necessarily all referring to the same embodiment. Further, certain features, structures, or features of one or more embodiments of the present disclosure may be combined.

Moreover, unless the claims are clearly stated, the sequence of the present disclosure, the use of the digital letters, or the use of other names is not configured to define the order of the present disclosure processes and methods. Although some examples of the disclosure currently considered useful in the present disclosure are discussed in the above disclosure, it should be understood that the details will only be described, and the appended claims are not limited to the disclosed embodiments. The requirements are designed to cover all modifications and equivalents combined with the substance and range of the present disclosure. For example, although the implementation of various components described above may be embodied in a hardware device, it may also be implemented as a software only scheme, e.g., an installation on an existing server or mobile device.

Similarly, it should be noted that in order to simplify the expression disclosed in the present disclosure and help the understanding of one or more embodiments, in the previous description of the embodiments of the present disclosure, a variety of features are sometimes combined into one embodiment, drawings or description thereof. However, this disclosure method does not mean that the characteristics required by the object of the present disclosure are more than the characteristics mentioned in the claims. Rather, claimed subject matter may lie in less than all features of a single foregoing disclosed embodiment.

In some embodiments, numbers expressing quantities of ingredients, properties, and so forth, configured to describe and claim certain embodiments of the application are to be understood as being modified in some instances by the term "about," "approximate," or "substantially." Unless otherwise stated, "approximately," "approximately" or "substantially" indicates that the number is allowed to vary by +20%.

Accordingly, in some embodiments, the numerical parameters used in the specification and claims are approximate values, and the approximate values may be changed according to characteristics required by individual embodiments. In some embodiments, the numerical parameters should be construed in light of the number of reported significant digits and by applying ordinary rounding techniques. Although the numerical domains and parameters used in the present disclosure are configured to confirm its range breadth, in the specific embodiment, the settings of such values are as accurate as possible within the feasible range.

For each patent, patent application, patent application publication, and other materials referenced by the present disclosure, such as articles, books, instructions, publications, documentation, etc., hereby incorporated herein by reference. Except for the application history documents that are inconsistent with or conflict with the contents of the present disclosure, and the documents that limit the widest range of claims in the present disclosure (currently or later attached to the present disclosure). It should be noted that if a description, definition, and/or terms in the subsequent material of the present disclosure are inconsistent or conflicted with the content described in the present disclosure, the use of description, definition, and/or terms in this manual shall prevail.

Finally, it should be understood that the embodiments described herein are only configured to illustrate the principles of the embodiments of the present disclosure. Other deformations may also belong to the scope of the present disclosure. Thus, as an example, not limited, the alternative configuration of the present disclosure embodiment may be consistent with the teachings of the present disclosure.

What is claimed is:

1. A system, comprising:
at least one storage device including a set of instructions;
at least one processor in communication with the at least one storage device, wherein when executing the set of instructions, the at least one processor is configured to cause the system to perform operations including:
obtaining multiple intestinal images of an examined object;
performing intestinal valve segmentation on at least a portion of the multiple intestinal images by a segmentation model to determine at least one independent intestinal valve, wherein the segmentation model includes a machine learning model that segments the at least a portion of the multiple intestinal images to determine edges of the at least one independent intestinal valve; and
marking the at least one independent intestinal valve in the at least a portion of the multiple intestinal images, wherein
the at least one independent intestinal valve includes one or more independent intestinal valves including no lesion and one or more independent intestinal valves including lesion,
each of the one or more independent intestinal valves including no lesion is marked by a first mark, and
each of the one or more independent intestinal valves including lesion is marked by a second mark, the first mark and the second mark having different forms.

2. The system of claim 1, wherein
the at least one processor is configured to cause the system to perform operations including: tracking the at least one independent intestinal valve segmented from the at least a portion of the multiple intestinal images;

wherein the tracking the at least one independent intestinal valve includes determining a same independent intestinal valve that appears in at least two images of the at least a portion of the multiple intestinal images,
the marking the at least one independent intestinal valve in the at least a portion of the multiple intestinal images includes: marking the at least one independent intestinal valve based on a tracking result of the at least one independent intestinal valve, wherein the same independent intestinal valve in the multiple intestinal images is marked using a same identification.

3. The system of claim 2, wherein the determining a same independent intestinal valve that appears in at least two images of the at least a portion of the multiple intestinal images includes:
performing a first matching on the at least one independent intestinal valve segmented from the at least a portion of the intestinal images to determine the same intestinal valve in the at least one independent intestinal valve; and
performing a second matching on a first independent intestinal valve that fails to be matched in the first matching in the at least one independent intestinal valve, and
determining a second intestinal valve in the at least one independent intestinal valve that is the same as the first independent intestinal valve.

4. The system of claim 3, wherein the performing a first matching on the at least one independent intestinal valve segmented from the at least a portion of the intestinal images to determine the same intestinal valve in the at least one independent intestinal valve includes:
determining an intersection over union (IOU) between an independent intestinal valve segmented from a current intestinal image of the multiple intestinal images and each independent intestinal valve segmented from N intestinal images previous to the current intestinal image; and
determining, based on the IOU and a preset threshold, whether the independent intestinal valve segmented from the current intestinal image and the independent intestinal valve segmented from the previous N intestinal images are the same intestinal valve.

5. The system of claim 1, wherein the performing intestinal valve segmentation on at least a portion of the multiple intestinal images by a segmentation model to determine at least one independent intestinal valve includes:
segmenting, based on the segmentation model, the at least a portion of the multiple intestinal images to output an initial segmented image for each intestinal image of the at least a portion of the multiple intestinal images;
determining whether an intestinal valve adhesion exists in the initial segmented image; and
if the intestinal valve adhesion exists in the initial segmented image, segmenting the initial segmented image to determine the at least one independent intestinal valve.

6. The system of claim 5, wherein an image background, the at least one independent intestinal valve, and an edge of each of the at least one independent intestinal valve are distinguished from each other in the initial segmented image.

7. The system of claim 5, wherein the segmenting the initial segmented image to determine the at least one independent intestinal valve includes:

generating multiple intestinal valve mask images based on contours of intestinal valves in the initial segmented image;

for each intestinal valve mask image including the intestinal valve adhesion among the multiple intestinal valve mask images, segmenting the intestinal valve mask image including the intestinal valve adhesion to determine an intestinal valve mask image of each independent intestinal valve by:

obtaining a segmentation line image including multiple line segments;

for each of the multiple line segments, determining a fitness value corresponding to the line segment;

determining a line segment with a largest fitness value among the multiple line segments as a best line segment;

segmenting the intestinal valve mask image including the intestinal valve adhesion based on the best line segment to determine the intestinal valve mask image of each independent intestinal valve.

8. The system of claim 7, wherein the determining a fitness value corresponding to the line segment includes:

determining a post-cut mask image after the intestinal valve mask image including the intestinal valve adhesion is cut by the line segment, the post-cut mask image including a first independent mask image and a second independent mask image;

determining a first independent mask convex hull image of the first independent mask image and a second independent mask convex hull image of the second independent mask image;

determining a first independent mask inner contour image based on the first independent mask image and the first independent mask convex hull image and determining a second independent mask inner contour image based on the second independent mask image and the second independent mask convex hull image; and determining the fitness value corresponding to the line segment based on the first independent mask inner contour image and the second independent mask inner contour image.

9. The system of claim 1, wherein the at least one processor is configured to cause the system to perform operations including:

prompting a user when the at least one independent intestinal valve includes an independent intestinal valve including lesion.

10. The system of claim 1, wherein the marking the at least one independent intestinal valve in the at least a portion of the multiple intestinal images includes:

for each of the at least one independent intestinal valve, determining a specific intestinal image in which the independent intestinal valve first appears; and numbering the at least one independent intestinal valve in an order according to a sequential order of the specific intestinal image in which each independent intestinal valve first appears.

11. The system of claim 1, wherein the segmentation model is determined by training a preliminary segmentation model based on a plurality of training samples, wherein each of the plurality of training samples includes a sample intestinal image, a label of the training sample includes a sample initial segmented image corresponding to the sample intestinal image, and edges of sample intestinal valves in the sample initial segmented image are thickened.

12. A method implemented on a computing device having at least one processor and at least one storage device, comprising:

obtaining multiple intestinal images of an examined object;

performing intestinal valve segmentation on at least a portion of the multiple intestinal images by a segmentation model to determine at least one independent intestinal valve, wherein the segmentation model includes a machine learning model that segments the at least a portion of the multiple intestinal images to determine edges of the at least one independent intestinal valve; and marking the at least one independent intestinal valve in the at least a portion of the multiple intestinal images, wherein the at least one independent intestinal valve includes one or more independent intestinal valves including no lesion and one or more independent intestinal valves including lesion, each of the one or more independent intestinal valves including no lesion is marked by a first mark, and each of the one or more independent intestinal valves including lesion is marked by a second mark, the first mark and the second mark having different forms.

13. The method of claim 12, further comprising:

tracking the at least one independent intestinal valve segmented from the at least a portion of the multiple intestinal images; wherein the tracking the at least one independent intestinal valve includes determining a same independent intestinal valve that appears in at least two images of the at least a portion of the multiple intestinal images, the marking the at least one independent intestinal valve in the at least a portion of the multiple intestinal images includes: marking the at least one independent intestinal valve based on a tracking result of the at least one independent intestinal valve, wherein the same independent intestinal valve in the multiple intestinal images is marked using a same identification.

14. The method of claim 13, wherein the determining a same independent intestinal valve that appears in at least two images of the at least a portion of the multiple intestinal images includes:

performing a first matching on the at least one independent intestinal valve segmented from the at least a portion of the intestinal images to determine the same intestinal valve in the at least one independent intestinal valve; and performing a second matching on a first independent intestinal valve that fails to be matched in the first matching in the at least one independent intestinal valve, and determining a second intestinal valve in the at least one independent intestinal valve that is the same as the first independent intestinal valve.

15. The method of claim 14, wherein the performing a first matching on the at least one independent intestinal valve segmented from the at least a portion of the intestinal images to determine the same intestinal valve in the at least one independent intestinal valve includes:

determining an intersection over union (IOU) between an independent intestinal valve segmented from a current intestinal image of the multiple intestinal images and each independent intestinal valve segmented from N intestinal images previous to the current intestinal image; and determining, based on the IOU and a preset threshold, whether the independent intestinal valve segmented from the current intestinal image and the independent intestinal valve segmented from the previous N intestinal images are the same intestinal valve.

16. The method of claim 12, wherein the performing intestinal valve segmentation on at least a portion of the multiple intestinal images by a segmentation model to determine at least one independent intestinal valve includes:

segmenting, based on the segmentation model, the at least a portion of the multiple intestinal images to output an initial segmented image for each intestinal image of the at least a portion of the multiple intestinal images;

determining whether an intestinal valve adhesion exists in the initial segmented image; and if the intestinal valve adhesion exists in the initial segmented image, segmenting the initial segmented image to determine the at least one independent intestinal valve.

17. The method of claim 16, wherein an image background, the at least one independent intestinal valve, and an edge of each of the at least one independent intestinal valve are distinguished from each other in the initial segmented image.

18. A non-transitory computer readable medium, comprising at least one set of instructions, wherein when executed by at least one processor of a computing device, the at least one set of instructions cause the at least one processor to effectuate a method comprising:

obtaining multiple intestinal images of an examined object;

performing intestinal valve segmentation on at least a portion of the multiple intestinal images by a segmentation model to determine at least one independent intestinal valve, wherein the segmentation model includes a machine learning model that segments the at least a portion of the multiple intestinal images to determine edges of the at least one independent intestinal valve; and marking the at least one independent intestinal valve in the at least a portion of the multiple intestinal images, wherein the at least one independent intestinal valve includes one or more independent intestinal valves including no lesion and one or more independent intestinal valves including lesion, each of the one or more independent intestinal valves including no lesion is marked by a first mark, and each of the one or more independent intestinal valves including lesion is marked by a second mark, the first mark and the second mark having different forms.

19. The non-transitory computer readable medium of claim 18, the method further comprising:

tracking the at least one independent intestinal valve segmented from the at least a portion of the multiple intestinal images; wherein the tracking the at least one independent intestinal valve includes determining a same independent intestinal valve that appears in at least two images of the at least a portion of the multiple intestinal images, the marking the at least one independent intestinal valve in the at least a portion of the multiple intestinal images includes:

marking the at least one independent intestinal valve based on a tracking result of the at least one independent intestinal valve, wherein the same independent intestinal valve in the multiple intestinal images is marked using a same identification.

* * * * *